United States Patent
Gilmour et al.

(10) Patent No.: US 7,239,606 B2
(45) Date of Patent: Jul. 3, 2007

(54) SCALABLE CONFIGURABLE NETWORK OF SPARSELY INTERCONNECTED HYPER-RINGS

(75) Inventors: John E. Gilmour, Gibsonia, PA (US); Raymond A. Young, Bethel Park, PA (US); James L. Klueber, New Alexandria, PA (US); Gerald M. Masson, Baltimore, MD (US); Giorgio L. Coraluppi, Pittsburgh, PA (US)

(73) Assignee: Compunetix, Inc., Monroeville, PA (US)

( * ) Notice: Subject to any disclaimer, the term of this patent is extended or adjusted under 35 U.S.C. 154(b) by 774 days.

(21) Appl. No.: 09/924,905

(22) Filed: Aug. 8, 2001

(65) Prior Publication Data
US 2003/0031123 A1 Feb. 13, 2003

(51) Int. Cl.
*G31R 31/08* (2006.01)
(52) U.S. Cl. ..................... 370/222; 370/406
(58) Field of Classification Search ............ 370/216, 370/222, 256, 406
See application file for complete search history.

(56) References Cited

U.S. PATENT DOCUMENTS

| | | | | |
|---|---|---|---|---|
| 4,317,196 A | * | 2/1982 | Ulug | 370/391 |
| 5,742,585 A | * | 4/1998 | Yamamoto et al. | 370/223 |
| 5,859,836 A | * | 1/1999 | Eslambolchi | 370/222 |
| 5,940,367 A | * | 8/1999 | Antonov | 370/218 |
| 5,999,712 A | * | 12/1999 | Moiin et al. | 709/220 |
| 6,021,113 A | * | 2/2000 | Doshi et al. | 370/228 |

OTHER PUBLICATIONS

Merrian-Webster's Collegiate Dictionary, 10th ed., p. 448.*

* cited by examiner

*Primary Examiner*—Brian Nguyen
(74) *Attorney, Agent, or Firm*—Ansel M. Schwartz

(57) ABSTRACT

A network over which a medium is transferred. The network includes S core rings. Each core ring can be modeled as a set of nodes interconnected by links, where S is greater than or equal to 4 and is an integer, each said core ring having at least N nodes, where N is greater than or equal to 4 and is an integer. Each node/link is configurable in terms of directing the medium from a given source toward a given destination, and where each of the core rings is directly connected by means of k spanning links, where k is greater than or equal to 2, so as to comprise a spanning ring to at least a second and a third of the other core rings. The combinations of core rings spanned by each core ring is such that there is a path comprised of links and nodes from each node on any core ring to any other node on any other core ring. A method for transferring a medium.

20 Claims, 26 Drawing Sheets

■ = EXTERNAL DEVICE

CORE RING-LINKS

PARALLEL SPANNING LINKS

TWISTED SPANNING LINKS

SAME CORE RING LINKS AS FIGURE 1
SAME I-RING AND O-RING LINKS AS FIGURE 1

RING X   1→4→5→0→3→2→1

RING Y   →7→(4)→(5)→8→11→6→7

RING Z   9→10→15→14→13→12→9

LINK 5 → 4 IS A PASS-THROUGH-UNIT FOR CONF Y

NODES 5 → 4 ARE PASS-THROUGH NODES FOR CONF Y (3, 3, 2) CONFERENCE-DISJOINT IMPLANTATION

X: 1→2→3→0→5→4→1

Z: 11→8→9→10→7→6→11

Y: 13→12→15→14→13

$$ALHD = \frac{(1+5)+(1+5)+(1+5)}{6} = 18/6 = 3$$

$$ALHD = \frac{(1+3)+(1+3)+(1+3)}{6} = 2$$

(2, 2, 2, 2) – DISJOINT (3, 3, 2,) – DISJOINT (4, 2, 2) – DISJOINT (4, 4) – DISJOINT

ALTERNATIVE FOR THE 10-NODE RING FOR THE
5-PARTY CONFERENCE IMPLANTATION
IN FIG.9(F) FOR THE (5, 3)-DISJOINT
IMPLANTATION EXAMPLE (6, 2) – DISJOINT

|   |   | 0 | | 1 | | 2 | | 3 | | 4 | | 5 | | 6 | | 7 | |
|---|---|---|---|---|---|---|---|---|---|---|---|---|---|---|---|---|
|   |   | 1 | 3 | 5 | 7 | 9 | 11 | 13 | 15 | 17 | 19 | 21 | 23 | 25 | 27 | 29 | 31 |
| 0 | 0  | X | X |   | 0 |   |   | 0 |   |   |   |   |   |   |   |   | 0 |
|   | 2  | X | X | 0 |   |   | 0 |   |   |   |   |   |   |   |   | 0 |   |
| 1 | 4  |   | 0 | X | X |   | 0 |   |   |   |   |   |   | 0 |   |   |   |
|   | 6  | 0 |   | X | X | 0 |   |   |   |   |   |   |   |   | 0 |   |   |
| 2 | 8  |   |   |   | 0 | X | X |   | 0 |   |   | 0 |   |   |   |   |   |
|   | 10 |   |   | 0 |   | X | X | 0 |   |   | 0 |   |   |   |   |   |   |
| 3 | 12 |   | 0 |   |   |   | 0 | X | X |   | 0 |   |   |   |   |   |   |
|   | 14 | 0 |   |   |   | 0 |   | X | X | 0 |   |   |   |   |   |   |   |
| 4 | 16 |   |   |   |   |   |   | 0 | X | X |   | 0 |   |   |   |   | 0 |
|   | 18 |   |   |   |   |   | 0 |   | X | X | 0 |   |   |   | 0 |   |   |
| 5 | 20 |   |   |   | 0 |   |   |   | 0 | X | X |   | 0 |   |   |   |   |
|   | 22 |   |   | 0 |   |   | 0 |   |   | X | X | 0 |   |   |   |   |   |
| 6 | 24 |   | 0 |   |   |   |   |   |   |   | 0 | X | X |   | 0 |   |   |
|   | 26 |   |   | 0 |   |   |   |   |   |   |   | 0 | X | X | 0 |   |   |
| 7 | 28 |   | 0 |   |   |   |   |   |   |   | 0 |   |   | 0 | X | X |   |
|   | 30 | 0 |   |   |   |   |   |   |   | 0 |   |   |   | 0 |   | X | X |

THE "X" INDICATES CORE RING LINKS

THE "O" INDICATES SPANNING RING LINKS

32 NODE (X RING WITH ONLY TWISTED SPANNING LINKS)

NOTE THAT 0-RING (EVEN NODE-TO-EVEN NODE) LINKS ARE NOT SHOWN

NOTE THAT 1-RING (ODD NODE=TO-ODD WITH) LINKS ARE NOT SHOWN

FIG.10

| | 1 | 3 | 5 | 7 | 9 | 11 | 13 | 15 |
|---|---|---|---|---|---|---|---|---|
| 0 | | 1, 3, (X, Φ) | -1, 3, (X, Φ) | | | | | |
| 2 | 1, 3, (X, Φ) | -1, 3, (X, Φ) | | | | | | |
| 4 | -1, 3, (X, Φ) | | 1, 5, (X, Y) | -1, 2, (Y, Φ) | | | | |
| 6 | | | | 1, 2, (Y, Φ) | | -1, 2, (Y, Φ) | | |
| 8 | | | 1, 2, (Y, Φ) | | | 1, 2, (Y, Φ) | | |
| 10 | | | | | -1, 3, (Z, Φ) | | | -1, 3, (Z, Φ) |
| 12 | | | | | (1, 3, (Z, Φ) | | -1, 3, (Z, Φ) | |
| 14 | | | | | | | 1, 3, (Z, Φ) | -1, 3, (Z, Φ) | e(i, j) = (D$_{i,j}$, LOAD$_{i,j}$, conf-ASSIGN(i, j) = (PRIMARY)(i, j), PASS-THRU(i, j))

*FIG. 11*

|    | 1    | 3    | 5    | 7    | 9    | 11   | 13   | 15   |
|----|------|------|------|------|------|------|------|------|
| 0  |      |      |      |      |      |      |      |      |
| 2  | -1,X | -1,X | 1,X  |      |      |      |      |      |
| 4  | 1,X  | 1,X  | -1,X |      |      |      |      |      |
| 6  |      |      |      | -1,Y | 1,Y  |      |      |      |
| 8  |      |      |      | 1,Y  | -1,Y |      |      |      |
| 10 |      |      |      |      |      | 1,Y  |      |      |
| 12 |      |      |      |      |      | -1,Y | -1,Z | 1,Z  |
| 14 |      |      |      |      |      |      | 1,Z  | -1,Z |

*FIG.12*

| 0 | 2 | 4 | 6 | 8 | 10 | 12 | 14 |
|---|---|---|---|---|---|---|---|
| $\phi,X3,\phi$ | $\phi,X2,\phi$ | $\phi,X1,Y$ | $\phi,Y1,\phi$ | $\phi,Y2,\phi$ | $\phi,Z2,\phi$ | $\phi,Z3,\phi$ | $\phi,Z1,\phi$ |

| 1 | 3 | 5 | 7 | 9 | 11 | 13 | 15 |
|---|---|---|---|---|---|---|---|
| $\phi,X1,\phi$ | $\phi,X3,\phi$ | $\phi,X2,Y$ | $\phi,Y1,\phi$ | $\phi,Z1,\phi$ | $\phi,Y2,\phi$ | $\phi,Z2,\phi$ | $\phi,Z3,\phi$ |

NODE-ASSIGNMENT(i) = (in(i), OUT(i), PASS-THRN(i))

*FIG. 13*

GENERIC 2P NODE RING STRUCTURE
IN A LINK INDICATOR MATRIX

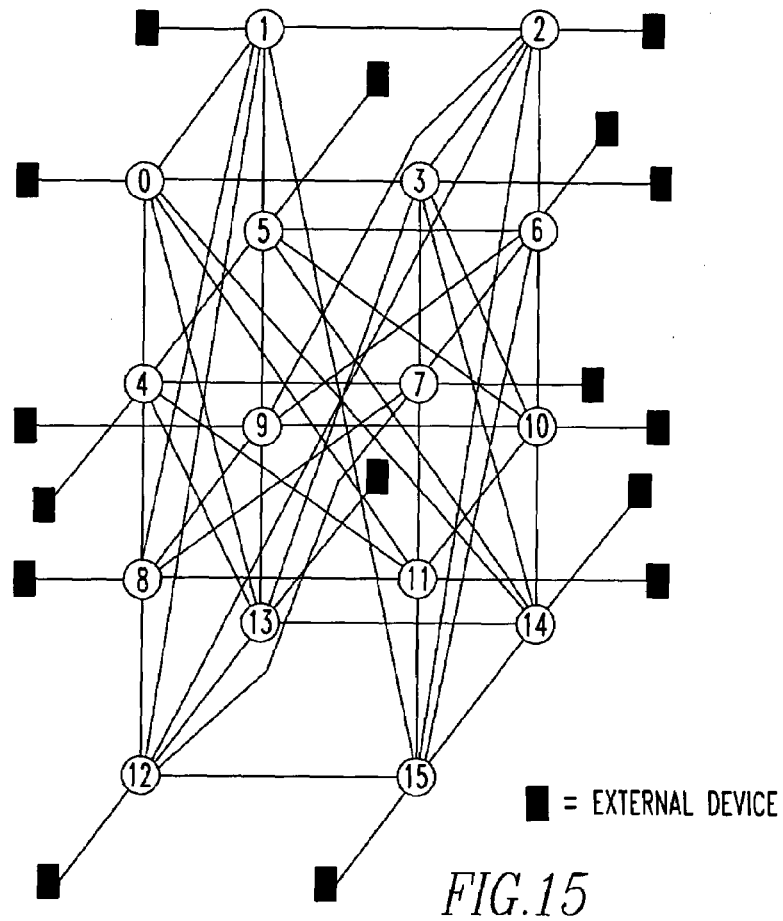
■ = EXTERNAL DEVICE
FIG.15
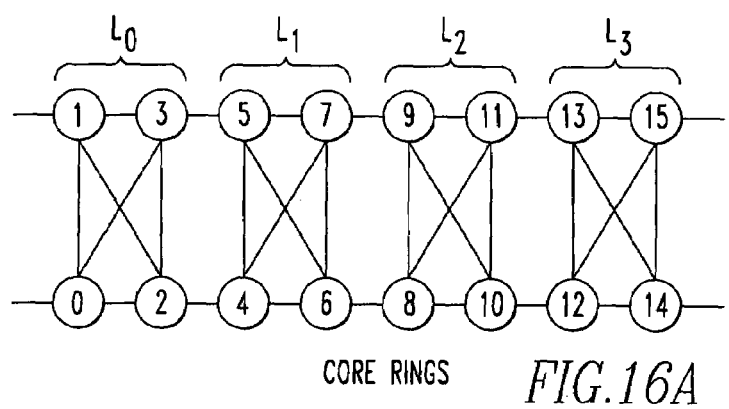
CORE RINGS    FIG.16A

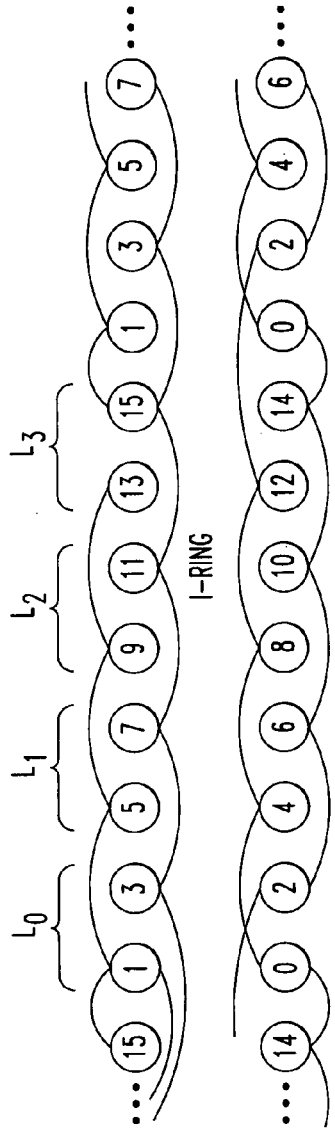
FIG.16B
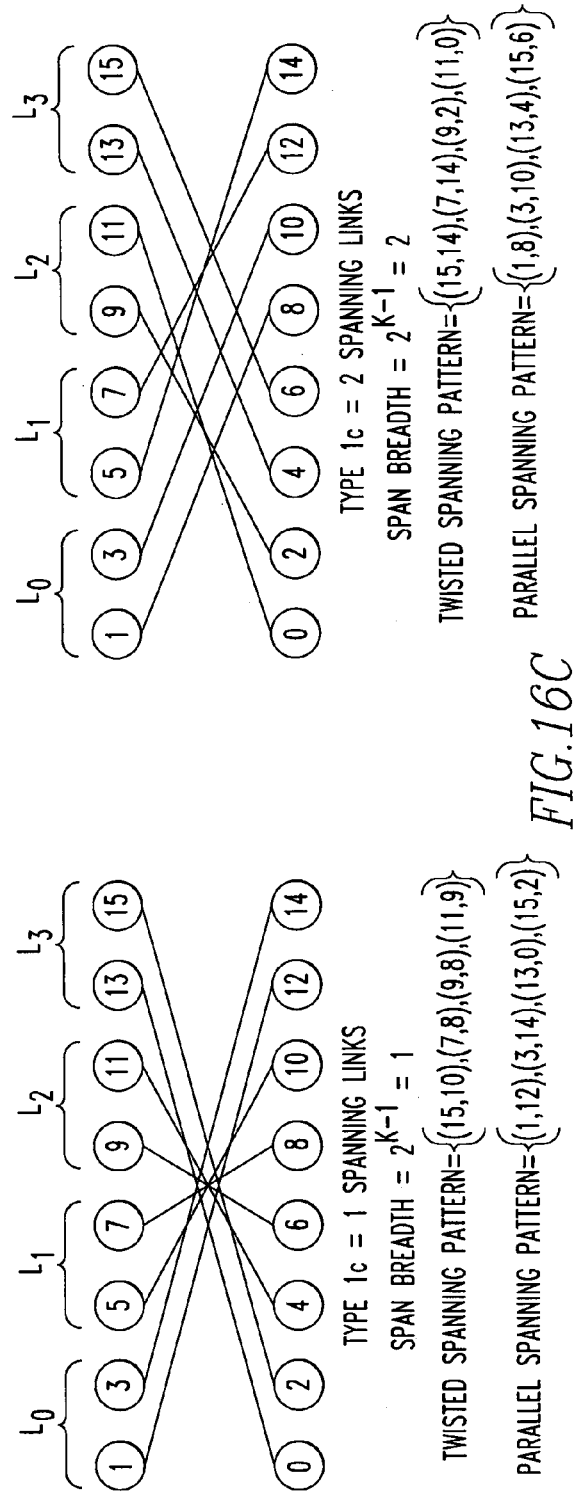

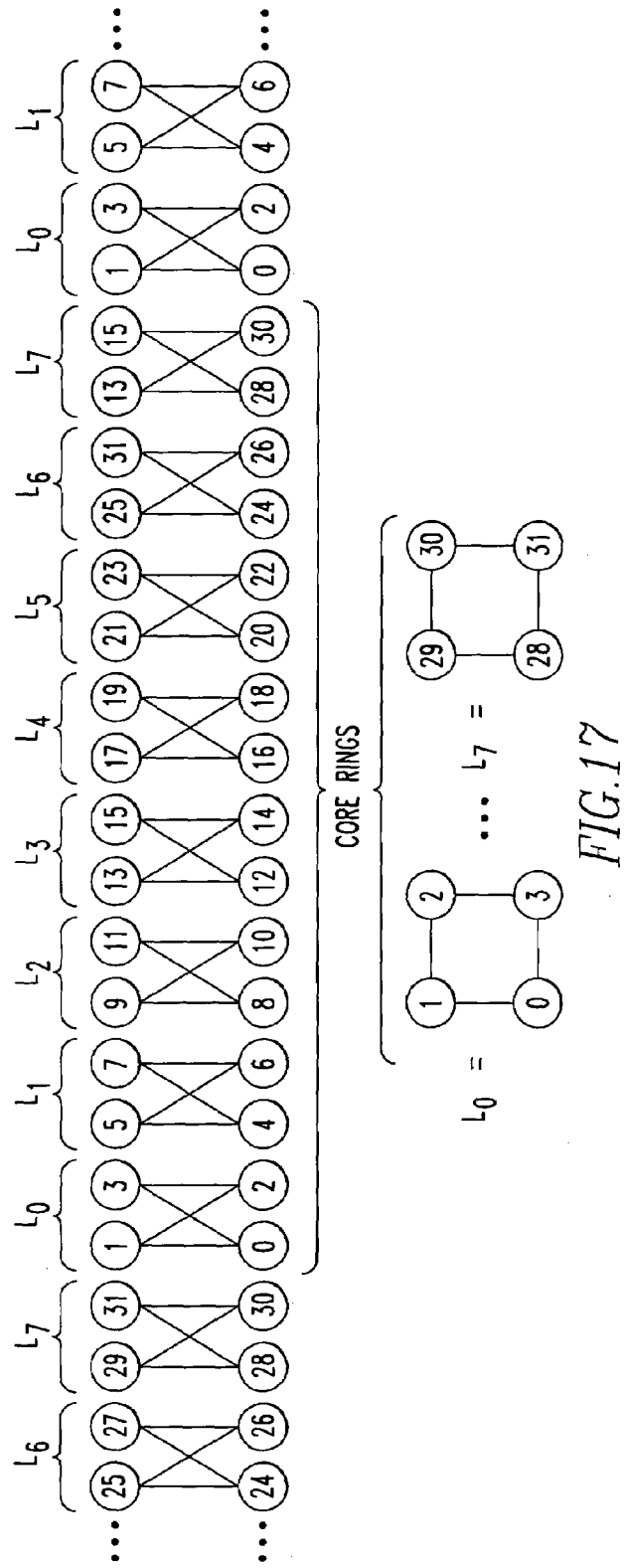
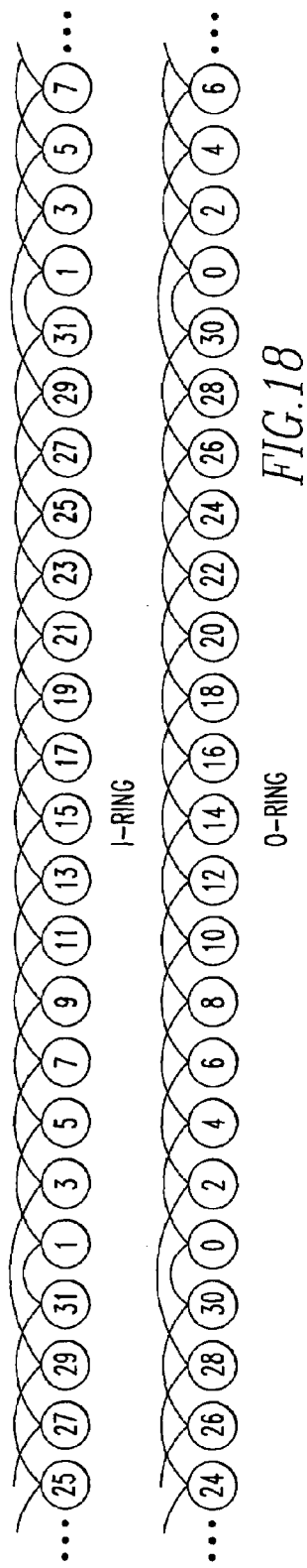
FIG.17
FIG.18

_US 7,239,606 B2_

SCALABLE CONFIGURABLE NETWORK OF SPARSELY INTERCONNECTED HYPER-RINGS

FIELD OF THE INVENTION

The present invention is related to a hyper-ring architecture for distributed processing applications. More specifically, the present invention is related to a canonical hyper-ring architecture for distributed processing applications having core rings of processing elements directly connected by spanning links.

BACKGROUND OF THE INVENTION

A distributed computing architecture will be described that is particularly appropriate for the support of the processing demands associated with what will be referred to as generic conferencing applications. From a broad and general perspective, the concept of a conference among a set of users can be viewed as a collaboration in which formatted discrete or continuous information is provided and accepted by users according to protocols and specifications that are application dependent. Within such an abstract conferencing scenario, the processing of the transmitted information can take place both at the source and destination devices employed by the users as well as by means of processing of information in-route to and from the users. Both modes of generic conference operational support represent valid modes of operation that must be provided by the conferencing infrastructure. Increasingly data-intensive, real-time conferencing applications depend on the availability of an underlying infrastructural capability that offers the needed functionality. The essence of the distributed computing architecture to be presented in the following can be characterized in terms of a highly efficient use of conferencing resources in order to provide a robust conferencing capability relevant to comprehensive range of generic applications.

SUMMARY OF THE INVENTION

The present invention pertains to a network over which a medium is transferred. The network comprises S core rings of processing elements. Each core ring can be modeled as a set of nodes interconnected by links, where S is greater than or equal to 4 and is an integer, each said core ring having at least N nodes, where N is greater than or equal to 4 and is an integer. Each node/link is configurable in terms of directing the medium from a given source toward a given destination, and where each of the core rings is directly connected by means of k spanning links, where k is greater than or equal to 2, so as to comprise a spanning ring to at least a second and a third of the other core rings. The combinations of core rings spanned by each core ring is such that there is a path comprised of links and nodes from each node on any core ring to any other node on any other core ring.

The present invention pertains to a method for transferring and processing a medium. The method comprises the steps of receiving the medium at a first configurable port of a first processing element of an array from a first external device. There is the step of transmitting the medium from a second configurable port of the first processing element to at least a first configurable port of a second processing element of the array over a first configurable link between the second configurable port of the first processing element and the first configurable port of the second processing element. There is the step of sending the medium from a second configurable port of the second processing element to a second external device. There is the step of receiving the medium from the second external device at a first configurable port of a third processing element of the array. There is the step of transmitting the medium from a second configurable port of the third processing element to at least a first configurable port of a fourth processing element of the array over a second configurable link between the second configurable port of the third processing element and the first configurable port of the fourth processing, wherein each processing element is disposed in the array at a same location and each processing element of the array has multiple configurable links with at least two other processing elements of the array.

BRIEF DESCRIPTION OF THE DRAWINGS

In the accompanying drawings, the preferred embodiment of the invention and preferred methods of practicing the invention are illustrated in which:

FIG. 4(*b*) shows an alternative Processing Element tree in which the Processing Elements assigned as Input Source Units operate as branch points FIG. 5(*a*) shows a ring of 6 Processing Elements is assigned to implement a 3-party conference denoted as Conference X.

FIG. 5(*c*) shows a 3-party conference denoted as Conference Z is implemented by means of RingZ=(5->4->7->10->15->14->11->8->5).

FIG. 6(*b*) shows a 2-party conference denoted as Conference Y is implemented by means of RingY=(6->7->4->5->8->11->6).

FIG. 6(*c*) shows a 3-party conference denoted as Conference Z is implemented by means of RingZ=(9->10->15->14->13->12->9).

FIGS. 9*a*-9*h* illustrate all 7 of the generic conference sets in the $2^{\{R=4\}}=16$ node canonical hyper-ring framework that can be implemented using mutually disjoint rings for each conference in each set.

FIG. 10 illustrates the twisted spanning links between the core rings L_{0}, L_{1}, . . . L_{6}, L_{7} in the $2^{\{R=5\}}=32$ node canonical hyper-ring framework.

FIG. 11 shows the state matrix for a 2^{R=4}=16 node canonical hyper-ring framework, where a resource assignment has been made such that 3 conferences are concurrently implemented by means of three rings as illustrated in FIG. 6.

FIG. 12 shows the link state matrix for a 2^{R=4}=16 node canonical hyper-ring framework where mutually disjoint resource assignments have been made as shown in FIG. 7.

FIG. 13 shows the node assignment vector for a 2^{R=4}=16 node canonical hyper-ring framework, where a resource assignment has been made such that 3 conferences are concurrently implemented by means of three rings as illustrated in FIG. 6.

FIG. 15 is a schematic representation of a hyper-ring of the present invention.

FIG. 16a is a schematic representation of a hyper-ring where 16 of the links are associated with 4 node core rings.

FIG. 16b is a schematic representation of a hyper-ring where 8 of the links are associated with an 8 node ring connecting all the odd numbered nodes, and 8 of the links are associated with another 8 node ring connecting all the even numbered nodes.

FIG. 16c is a schematic representation of a hyper-ring where 16 of the links are used to span nodes in different core rings.

FIG. 17 illustrates the resulting link pairs for Step 1 for 2^{5}=32 nodes comprising the core rings L_{0}, L_{15}, L_{2}, L_{3} . . . L_{7} in the hyper-ring canonical network framework.

FIG. 18 is an illustration of the link pairs corresponding to the I ring and the O ring according to Step 2 of the 2^{5} node hyper-ring canonical network framework specification procedure.

DETAILED DESCRIPTION

Figure 1A:
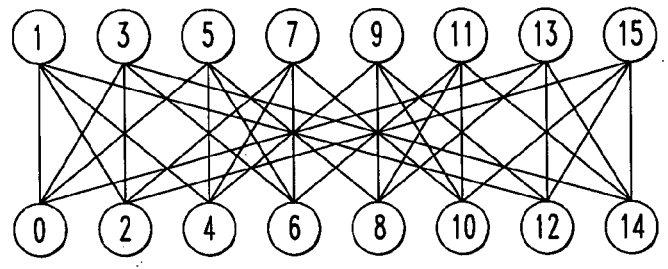
FIG. 1 shows an example of a $2^{\{R=4\}}=16$ node canonical hyper-ring framework.
Figure 1B:
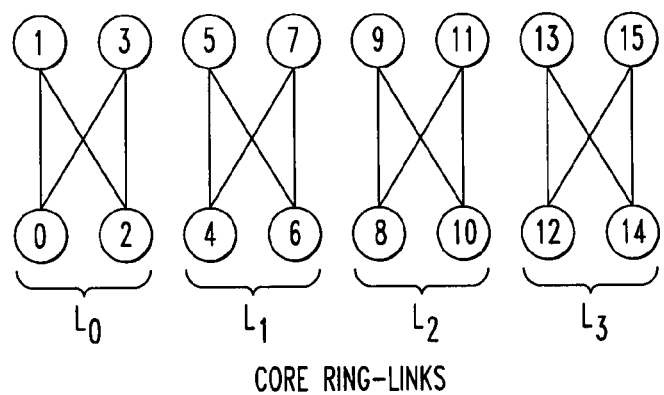
Figure 1C:
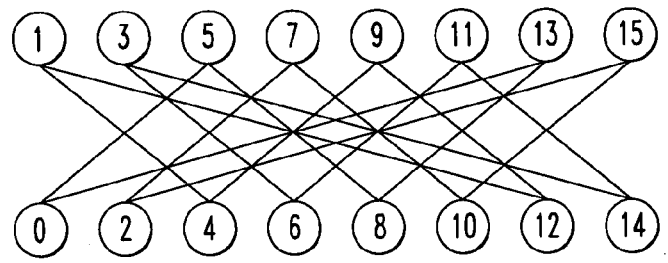
Figure 1D:
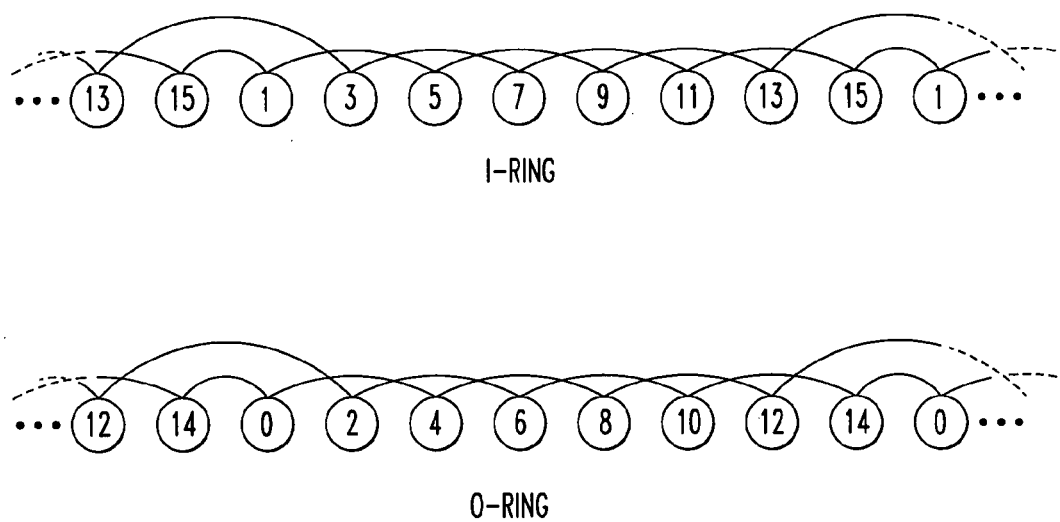

Referring now to the drawings wherein like reference numerals refer to similar or identical parts throughout the several views, and more specifically to FIG. 15 thereof, there is shown a network over which a medium is transferred. The network comprises S core rings. Each core ring can be modeled as a set of nodes interconnected by links, where S is greater than or equal to 4 and is an integer, each said core ring having at least N nodes, where N is greater than or equal to 4 and is an integer. Each node/link is configurable in terms of directing the medium from a given source toward a given destination, and where each of the core rings is directly connected by means of k spanning links, where k is greater than or equal to 2, so as to comprise a spanning ring to at least a second and a third of the other core rings. The combinations of core rings spanned by each core ring is such that there is a path comprised of links and nodes from each node on any core ring to any other node on any other core ring.

Alternatively, the medium can include fluid and each node includes a pump for pumping the fluid. Alternatively, the medium includes electricity and wherein each node includes a transmitter/receiver for flow of the electricity. Alternatively, the medium includes photons and wherein each node includes a transmitter/receiver for flow of the said photons.

Preferably, the first ring is connected to the second ring by at least one spanning ring in which the directionality of the medium flow is configurable. The nodes of each ring preferably are connected by core links in which the directionality of the medium flow is configurable. Preferably, the nodes of each ring are configurable so as to serve simultaneously as both input sources of the transferred medium or output destinations of the transferred medium. The links are preferably bi-directional regarding the medium flow. Preferably, the medium includes data and wherein each node includes a processor for processing the data.

A specified subset of nodes and links can represent planar or multi-dimensional surfaces that facilitate the movement of objects in a multi-dimensional space from one location to another relative to both the sides of surfaces and relationships to nodes/links. Each core ring can have associated spanning links that span to all other core rings, or some subset thereof, that according to any specified ordering of the core rings are some function of a power of any integer k greater than or equal to 2 distant from the core ring.

Each core ring can have associated spanning links that span to some subset of all other core rings such that any node of a core ring can be linked to any other node of another core by means of a pre-determined number of hops to intermediate core rings. Nodes can be assigned to sub-rings of any prescribed sizes such that the sum of the sizes is less than or equal to the totality of nodes in the network and such that each sub-ring is disjoint regarding nodes and links from all other sub-rings.

Nodes can be assigned to sub-rings of any prescribed sizes and regardless of any existing assignments of nodes/links to disjoint sub-rings, a new additional sub-ring assignment can be made that is also disjoint from all existing sub-rings without modifying the existing assignments. Nodes can be assigned to sub-rings of any prescribed sizes and regardless of any existing assignments of nodes/links to disjoint sub-rings a new additional sub-ring assignment can be made that is also disjoint from all existing sub-rings with only a specified upper-bounded modification of the existing assignments.

Nodes can be assigned to sub-rings of any prescribed sizes according to a specified criterion regarding the impact on existing assignments nodes/links relative to new additional assignments in the presence of some specified number of faulty nodes/links. Each node in a core ring unto itself can represent an embedded network. The nodes of the core rings can also have spanning links according to specified binding patterns regarding network to network coverage and reachability.

Each core ring can have associated spanning links that span to some subset of all other core rings such that any node of a core ring can be linked to any other node of another core by means of a pre-determined number of hops to intermediate core rings and where each hop corresponds to a core ring to core ring distance that is a function of a power of two. Each core ring can have associated spanning links that span to some subset of all other core rings such that any node of a core ring can be linked to any other node of another core by means of a pre-determined number of hops to intermediate core rings and for which an algorithm to determine an appropriate combination of such hops can be based on a binary representation of the distance between the two core rings. Each core ring can have associated spanning links that span to some subset of all other core rings such that any node of a core ring can be linked to any other node of another core by means of a pre-determined number of hops to intermediate core rings and for which an algorithm to determine an appropriate combination of such hops can be based on a function of k that expresses the distance between the two core rings.

The directionality of the medium flow over each of the links between nodes can be pre-configured in terms of orientation. The directionality of the medium flow over each of the links between nodes can be pre-configured in terms of orientation and the nodes are partitioned into fixed categories according to whether they operate as conduits serving external devices as network input sources of medium and/or as network output destinations of medium.

The directionality of the medium flow over each of the links between nodes can be pre-configured in terms of orientation and the nodes are partitioned into fixed categories according to whether they operate as conduits serving external devices as network input sources of medium and/or as network output destinations of medium and there is an orientation bias regarding input source to output destination medium flow. Each node can be associated with at least one other node which can serve as a back-up node regarding network reconfiguration so as to tolerate link and/or node failures.

The present invention pertains to a method for transferring a medium. The method comprises the steps of receiving the medium at a first configurable port of a first processing element of an array from a first external device. There is the step of transmitting the medium from a second configurable port of the first processing element to at least a first configurable port of a second processing element of the array over a first configurable link between the second configurable port of the first processing element and the first configurable port of the second processing element. There is the step of sending the medium from a second configurable port of the second processing element to a second external device. There is the step of receiving the medium from the second external device at a first configurable port of a third processing element of the array. There is the step of transmitting the medium from a second configurable port of the third processing element to at least a first configurable port of a fourth processing element of the array over a second configurable link between the second configurable port of the third processing element and the first configurable port of the fourth processing, wherein each processing element is disposed in the array at a same location and each processing element of the array has multiple configurable links with at least two other processing elements of the array.

In the operation of the invention, the breadth of applicability of an abstract conferencing scenario is significant in terms of the interpretation of concepts and results to be presented. It should be kept in mind that while such a broad conferencing perspective is clearly appropriate for the consideration of telecommunications environments, the range of possible distributed computing models represented by this abstract conferencing perspective extends as well to many other application environments. For example, large-scale interactive simulations utilizing a distributed collection of independent software modules that must be accessed and executed on data-sets according to the dynamics of a simulated environment can be viewed as as a conferencing application. This follows from the observation that an interactive distributed simulation can be described as a collection of interacting sources/destinations of information which must be processed and exchanged in accordance with well-defined performance parameters.

Indeed, any computationally intensive real-time or otherwise processing application in which the required functionality must be distributed among multiple interacting processing units essentially represents a conferencing scenario. This general conferencing perspective is very relevant for the increasingly number of interactive applications that are emerging with a scale of computational demands that render as insufficient the functionality offered by a single shared centralized processing unit.

In many such cases, to maintain the quality of service demanded by the various sets of users, the computational tasks must be distributed among multiple interacting processing units in accordance with a generic conferencing scenario.

A generic conference perspective permits an enormous range of applications to be put forth as potentially benefiting from the use of the conferencing technologies to be presented in the following sections, ranging not only from simulations based on detailed models of physical science phenomena, but also to real-time distributed command and control applications, as well as to the evaluation of space/astronomy images based on multiple sources of (often noisy) telemetry, and to design collaborations of large-scale, complex systems among geographically dispersed project teams. Suffice it to say that while the terminology of the range of conferencing scenarios and technologies to be discussed in the following is expressed for the purposes of illustration in a telecommunications context, it should be understood that the domain of possible applications is far more extensive, and the telecommunications setting used has been selected primarily as a convenience and should not be interpreted as a limitation to the generality of the results/concepts provided.

A conference can be implemented by means of the operation of a conferencing server facility into which input content streams from a group of conference participants can be delivered via a general wide-area or local dedicated communications infrastructure. The input content streams arriving at the server must be processed according to the requirements of the supported applications and then returned to the conference group members. The required processing of the input content streams at the conferencing server can be exceedingly demanding in terms of minimizing delays, particularly in regards to the real-time applications that are now critical to many conferencing scenarios.

Increasingly, real-time conferencing processing capabilities can only be achieved by means of tightly-coupled cluster/array computing architectures comprised of high-performance processing units in which the functions that must be applied to the transmitted content are distributed among the computing array processing units. In many conferencing applications these functions can be quite specialized, so these processing units are not general purpose in nature, but rather are often customized (in terms of hardware and/or software) to the unique processing demands of the applications. Within a computing array, this customization can be in the form of specialized hardware functionality, or can alternatively be software programmable and thus easily varied depending on the user requirements.

In order to convey this quality of customization of a processing unit's functionality when employed in conferencing scenarios supported by cluster computing arrays, the concept of a digital signal processing unit (Processing Element) will be utilized. This terminology will be used in order to characterize the processing units general capabilities in providing the appropriate conferencing functionalities. However, in the event that an application can utilize general purpose processing units (for example, applications developed for a network of workstations), it should be understood that the cluster array architectures to be presented would still be relevant since the specifics of the functionalities offered by the processing units comprising the array should not be construed in any way to limit the overall significance of the offered architectures.

The concept of a PE array as the processing engine of a conferencing server is applicable to a wide range of distributed computing scenarios in which Processing Elements must interact by means of processing and exchanging content streams of continuous or discrete packetized information in order to support computationally intensive applications. The connectivity capabilities required of the PE array infrastructure are, in general, exceedingly demanding, spanning the provision of best-effort point to point transmissions among pairs of Processing Elements to the alternative of providing secure and reliable multipoint to multipoint multicasting from groups of Processing Elements to a subset (or even all) of the other Processing Elements in the array. Hence, as previously explained, in the discussions of the operation of the PE array in support of generic conferences, the context of a communications setting will be used, but the generic notion of a conference should always be kept in mind as being represented by a collection of interacting sources/destinations of information which must be processed and exchanged in accordance with well-defined performance parameters. The implementation of this generic conference concept will represent the underlying operational scenario upon which the applications that can be addressed by a Configurable Hyper-Ring will be expected to reside. All of the application examples put forth, and many others that could be cited as well, should be seen as representative of computationally demanding scenarios that can be addressed using a Configurable Hyper-Ring of the type to be described in detail in this document.

A Configurable Hyper-Ring can be viewed as an ensemble of conferencing resources and functionalities that can be employed for the implementation of conferences by the assignment of communication links and associated Processing Elements to support various concurrent conferencing applications. In general, a conference is implementated by means of establishing a set of directed paths (or, more generally directed trees, or directed rings) within the array comprised of the Processing Elements and their interconnecting links for the processing and transmission of the input content streams provided by the conference participants. A conference resource assignment and configuration algorithm utilizing specified priority criteria (such as, for example, resource (that is, Processing Element and link) disjointedness of concurrent conference implementations within a PE array, or average shortest PE-link path between all the Processing Elements associated with a given conference) is responsible for making this assignment.

A Configurable Hyper-Ring utilizes a canonical network framework to provide the underlying infrastructure which determines the range of configurations that can be implemented in the PE array and efficiency of the resulting implementations. As will be seen, the canonical network framework described in this document provides an innovative asymmetrical, skewed, and sparse link interconnection structure among the Processing Elements. The asymmetrical link interconnection structure among the Processing Elements is in contrast to alternative structures that are inherently symmetrical (for example, rings, meshes or hypercubes) in the sense that the relationship a specific Processing Element within the framework has with other Processing Elements in the framework varies according to its location.

Within a Configurable Hyper-Ring, the canonical network framework is configured to support concurrent conferences by means of the assignment of Processing Elements and the setting of link directions (referred to as link directionalizing). For conferencing applications, it is advantageous for the link connectivity available between Processing Elements within the PE 1.0 array of a Configurable Processing Array to make available robust combinations of minimal length PE-link paths joining the participants in each of the concurrent conferences. These PE-link paths would optimally be resource disjoint from all other such paths supporting the other existing conferences. Moreover, the establishment of these PE-link paths in response to a conference request must be performed efficiently and without the debilitating overhead of wasted link bandwidth and/or Processing Element processing execution cycles. The asymmetry of the canonical network framework to be described allows configurations of the PE array to be set-up that provide a bias towards certain types of resource assignments with desirable attributes in regard to efficiently providing compact and disjoint sets of PE-link paths for joining the participants of a concurrent conference implementations.

The availability of increasingly powerful processing devices and high-speed connection links as commodity components are together making tightly-coupled clusters/arrays of computational units an appealing vehicle for cost-effective, high performance, and high availability computing that can be implemented as a single integrated circuit chip or a single board module. Such implementations of tightly-coupled processing arrays can be employed in a wide variety of computationally demanding applications, including, for example, large-scale event simulators, real-time distributed strategic support systems, and Web-intensive data mining applications. Moreover, it should be kept in mind that the use of processing arrays as a computing platform is not limited to scientific and engineering applications as there are many business and financial applications that benefit from the use of high performance computing arrays as well.

The flexibility of use of a processing array implemented in the form of either an integrated circuit or as a single board module is significantly enhanced if the essential components are configurable relative to providing an inherent capability to dedicate combinations of subsets of the available processing devices and associated interconnecting links in order to support various concurrent applications. Indeed, the essence of the concept of the Configurable Hyper-Ring to be described in this document can be viewed as an innovative and exceedingly powerful extension of the well-known notion of programmable logic arrays now commonly employed in many digital circuit designs. Fundamental to the concept of a Configurable Hyper-Ring will be the utilization of a canonical network framework as the underlying processing array infrastructure. A canonical network framework must be able to provide a broad range of link connectivity configurability options among the availability processing devices.

Conferencing applications, such as real-time audio/video interactions, among geographically dispersed participants employing a wide variety of user communication and computing devices are highly demanding of their supporting processing capabilities. Increasingly, such processing capabilities can only be achieved by using a tightly-coupled array of digital signal processing units (referred to in the following as a PE array) located at a central conferencing server facility that can be efficiently configured to support real-time collaborations as the user requests for conferences are received at the facility and must be implemented and supported. But it should be understood that the notion of conference as discussed in the following is actually much broader than the concept of a multimedia conference interaction. Indeed, any computationally intensive real-time application in which the functionality offered by a shared centralized processing unit cannot be expected to maintain the quality of service demanded by a set of users and must therefore be distributed among multiple interacting processing units essentially represents a conferencing scenario.

The utilization of a configurable PE array has numerous advantages for conferencing applications. Included among these advantages are the following:

In addition to providing significant processing power, by means of configuring the link interconnection structure, various load balancing techniques can be employed that distribute the computational requirements among the Processing Elements in the array according to the applications needs. Configurable load balancing is essential in many distributed applications in which the overall processing demands relative to an application can vary over time.

Quality of conferencing performance can be measured using a variety of metrics. The average delay that a input content stream must endure before this stream can be forwarded to a destination is a particularly common and insightful measure that relates well to overall array performance. A bottleneck of a single Processing Element or link can cause a major deterioration of an application in high-demand loading situations. The capability of configurating the array to minimize delays can be critical the quality of service provided.

Robust configurable connectivity among the tightly-coupled Processing Elements in a cluster/array provides an inherent fault tolerance capability. When the link interconnection structure of the PE array is robust, in the presence of known faulty Processing Elements, an ability to support conferences while using the link configurability to avoid the utilization of the flawed processing devices can be employed to achieve graceful degradation of the application as well as faulty PE unit isolation for replacement without total shutdown array operation.

Conferencing applications will often require that the security of the content associated with the interaction be guaranteed. This is generally achieved by means of information encryption and decryption using multiple key set exchanges among the Processing Elements to limit access and assure the privacy of the supported collaboration. Such a process can be enormously time consuming and highly demanding of significant processing capabilities. A configurable tightly-coupled PE array offers the ability to customize a secure sub-array for performing sensitive conferencing functions for specific applications without the overhead of accumulated delay costs and processing penalties that might otherwise occur for all applications if configuration were not possible.

Other configurable PE array advantages could be cited here. But the point should be clear that configurability within an array of high-performance computing units is an broadly useful capability for the support of generic conferencing applications.

Relative to generic conferencing applications, a model of an operational scenario involves external sources of content being generated by devices employed by conference participants generating emitting input streams that are transmitted over a wide-area or local communications infrastructure to the PE array. These input streams must be processed by the Processing Elements and then functionally integrated into specified combinations of output streams to satisfy the real-time requirements of the conferencing applications. The processed output streams are then transmitted back to the conference participants as outputs of the PE array.

Such generic conferencing activities are often classified as multipoint to multipoint multicasting. The classification indicates that within in a given conference of users, multiple source points of content are being concurrently delivered to multiple destination points. In other words, each single source point of content associated with a specific user is said to be multicasting its content to all or some subset of the other users associated with the conference.

In such multipoint to multipoint multicasting generic conferencing scenarios, a number of variations in the models of operation of the PE array of the conferencing server are possible in terms of functional modes of the Processing Elements and the connectivity provided by the links.

Dual mode Processing Elements with bidirectional links. In one possible model of the operation of the PE array for a generic conferencing application, each input content stream from a given user is presented to an assigned Processing Element in the PE array, and the output content stream to be returned to that same user leave the PE array from that same Processing Element. In this case, a Processing Element assigned to support a conference has a dual role of serving as both a Input Source Unit and Output Destination Unit. A further refinement of such a model involves the bidirectionalizing of the links of the canonical network framework in the sense that content can flow in both directions between the two Processing Elements connected by a link. It should be clear that the bidirectionalizing of the links of the canonical network framework essentially means that the links are not explicitly configured by the conference resource assignment algorithm; rather the links are always available for use in transmitting content to and from the Processing Elements to which they are connected, and the only limit to use of a link is related to the bandwidth provided in relation to the bandwidth of the content streams demanded by a conference. Finally, it is possible that a processing element for this mode to serve multiple users simultaneously.

Dual mode Processing Elements with configurable unidirectional links. In another possible model of operation of the PE array for a generic conferencing application, each input stream from a user is presented to an assigned Processing Element in a PE array, and the output stream destined for that user leaves the PE array from that same Processing Element; but in this case the link connectivity of a link between two Processing Elements can be assigned in only one direction by the conference resource assignment algorithm. Such links are referred to as programmable links.

Single mode Processing Elements with bidirectional links. In this operational model, each Processing Element can be assigned to serve as either an Input Source Unit or an Output Destination Unit for a user, but not both. Thus, in general, each user of the conferencing array is actually assigned two Processing Elements, one serving as the Input Source Unit and the other serving as the Output Destination Unit. But it should be noted that the conference resource assignment algorithm has the flexibility of assigning each Processing Element in the array to serve in either of the two modes of operation. In this model, the links can still be configured as bidirectional. The usefulness of these bidirectional links in conjunction with single mode Processing Elements is related to a so-called pass-through mode of operation of a Processing Element in which content not destined for the user assigned to a particular Processing Element can never be transmitted through that Processing Element in order to reach another Processing Element in the array. Pass-through modes of operation are discussed and illustrated below.

Single mode Processing Elements with unidirectional links: In this model, each Processing Element can be assigned to serve as either a Input Source Unit or an Output Destination Unit for a user, but not both. Again, in general, each user of the conferencing array is actually assigned two Processing Elements, one serving as the Input Source Unit and the other serving as the Output Destination Unit. But in this case, each link is unidirectional in that it can be programmed by the conference resource assignment algorithm to permit content to flow in only one direction.

Clearly, the operational model using single mode Processing Elements with unidirectional links is the most restrictive in terms of the uses of the Configurable Hyper-Ring resources, and is therefore the most challenging regarding multipoint to multipoint multicasting generic conferencing scenarios and will accordingly receive the most attention in the following discussions. But for each of the operational modes and link models given above, it should be clear that the accumulated bandwidths and associated array connectivities required by these multiple input streams moving from input source Processing Elements to output destination Processing Elements in each of these models can be exceedingly demanding. Accordingly, the connectivity among the Processing Elements, the associated bandwidth availability of the links, and the operational modes of the Processing Elements in the PE array are collectively critical from the perspective of the performance of real-time generic conferencing applications, and the extent to which each is supported by the PE array represents a fundamental trade-off.

Obviously, the ideal situation for cluster array based conferencing applications would be for each Processing Element in the employed PE array to have a dedicated connection with unlimited bandwidth to every other Processing Element so that each input stream could be transmitted directly to any other Processing Element efficiently and with minimal overhead. However, such extensive and dedicated connectivity and bandwidth availability would in general be prohibitively expensive, particularly since the numbers of Processing Elements involved in most conferencing applications of interest will at times, if not almost always, be considerable. As an example of the cost of dedicated complete connectivity, if there were N Processing Elements in the PE array, and there was a dedicated link between each pair of the N Processing Elements, there would be a total of $$\binom{N}{2} = \{(N)\times(N-1)\}/\{2\} \text{ links in the array.}$$

Accordingly, there is a fundamental and inherently critical trade-off that must be addressed regarding the link interconnection structure provided within a cost-effective PE array to support distributed multimedia processing (as well as other related applications): namely, the connectivity and bandwidth availability of the link interconnection structure must be limited in terms of the physical resources required in order to control cost, while at the same time the functional interconnection capabilities provided by the PE array must be robust in order to deliver performance. This fundamental trade-off is among the core issues relevant to the field of cluster/array computing, and is the focus of the Configurable Processing Array described herein.

The underlying foundation of a Configurable Hyper-Ring is a canonical network framework. The canonical network framework provides the infrastructure upon which directional links and Processing Elements can be assembled by means of a programmable configuration process. As discussed above, complete dedicated connectivity between all Processing Elements is in general not feasible because of the $O(N^{2})$ links required. For alternative examples, an $N \times N$ mesh or a hypercube or others could be utilized as canonical network frameworks.

In general, the Processing Element and link connectivity of a canonical network framework can be expressed in the form of an undirected graph on which the nodes correspond to the positions at which Processing Elements can be placed and undirected edges correspond to the links connecting the Processing Elements that can be directionalized by means of the conference resource assignment algorithm. Such an abstract representation of a canonical network framework illustrates the generality of a canonical network framework relative to the range of configurations that can be implemented.

For example, a canonical network framework represented by a simple ring with N nodes and N links in which each node has links to exactly two other nodes would have a very sparse link requirement, but this attribute would be significantly offset by the exceedingly restrictive range of possible configurations that could be achieved by directionalizing the links. In contrast, a two-dimensional $n \times n$ mesh (or toroid with the boundary nodes linked around to each other) would offer a more robust range of possible configurations among the $N=n \times n$ with twice the number of links in comparison to the simple ring and where each node has 4 links to other nodes.

The Configurable Hyper-Ring architecture that is the focus of this discussion is based upon an innovative canonical framework that can be configured into a wide variety of PE array interconnection structures to address the fundamental trade-off regarding cluster/array computing discussed above. This is accomplished by means of an innovative programmable link directionality capability in conjunction with a robust foundational link connectivity infrastructure within the architecture of the PE array.

The essence of the structure of the hyper-ring canonical network framework is that the nodes and associated link connectivity can be viewed as a collection of intersecting rings (hence the term hyper-ring). Within such a hyper-ring structure, the nodes and links within different rings can be merged to form larger rings. Moreover, the nodes and links of different rings can be combined to form other structures such as trees or cubes.

A 16 node example of the hyper-ring canonical network framework of a Configurable Hyper-Ring is illustrated in FIG. 15 for the case where the Configurable Hyper-Ring would be capable of linking and assigning 16 Processing Elements to implement various combinations of concurrent conferences. The 16 node canonical network framework of FIG. 15 shows all links without a programmed directionality and none of the Processing Element node positions has been assigned to operate as either an input source of multimedia content coming from a conference participant or as a destination of array output of processed multimedia content to be returned to conference participants. This 16 node hyper-ring canonical network framework of a PE array is said to be completely non-configured.

This essential structure represented by the example of the undirected 16 node hyper-ring canonical network framework in FIG. 15 is offered as having inherent capabilities for the implementation of multimedia conferences. Note that with a 16 node version of the canonical network framework, there are $$\binom{16}{2} = 120$$

possible links that could be provided as part of the underlying infrastructure. It can be seen from FIG. 15 that the 16 node hyper-ring canonical network framework is actually quite sparse regarding link deployment in that only log $\{16\}+2=6$ links are associated with each node, resulting in a total of 48 links actually used in the entire canonical network framework.

FIG. 15 shows a 16 node hyper-ring canonical network framework of a Configurable Hyper-Ring with out established link directions and neither Input Source Unit designations and Output Destination Unit designations for the Processing Element positions. The conferencing devices utilized by the conference participants and connected to the conferencing array via the existing external communications infrastructure are denoted by means of the black boxes directly attached to each node. The other 6 connections to each node correspond to the links connecting Processing Elements within the array.

It should be noted that the 16 node hyper-ring canonical network framework as shown in FIG. 15 can be described as a stack comprised of four levels of 4 node rings, denoted as L_{0}, L_{15}, L_{2}, L_{3}. The four 4 node rings are referred to as the core rings of the 156 node canonical network framework. In addition to the total number of 156 links connecting nodes within each ring of the core rings of the ring stack, the other 32 links can be seen to be interconnecting various pairs of nodes each associated with different levels of core rings of the ring stack. Such links can be used to merge combinations of the 4 node core rings of the into larger rings. This will be illustrated generally below.

The complexity of FIG. 15 suggests that, in general, there will have to be a systematic identification of the links within a hyper-ring structure in order to efficiently employ the links and Processing Elements in the support of conferencing requests. This will be described in detail below. However, it is illustrative to initiate this general specification of the link placements by first decomposing the links of the 16 node canonical network framework of FIG. 15 into structural categories.

The 48 links of the 16 node hyper-ring canonical network framework of a Configurable Hyper-Ring can be partitioned into 4 disjoint categories: 16 of the links are associated with the four 4 node core rings; 8 of the links are associated with an 8 node ring connecting all the odd number labelled nodes; 8 of the links are associated with another 8 node ring connecting all the even number labelled nodes (the odd node labels and the even node labels are, of course arbitrary, but will be seen to be useful as a reference when various canonical network framework configurations are explored); and 16 of the links are used to span nodes in different core rings. By using these structural categories, the essence of the link connectivities provided within the canonical network framework can be established in a systematic and comprehensive manner for the general case of a the $2^\{R\}$ node canonical network framework.

FIG. 16 shows a 16 node hyper-ring canonical network framework of a Configurable Hyper-Ring with the 48 links partitioned into 4 disjoint structural categories: (1) 16 of the links are associated with the four 4 node core rings; (2) 8 of the links are associated with an 8 node ring connecting all the odd numbered nodes, and 8 of the links are associated with another 8 node ring connecting all the even numbered nodes; (3) 16 of the links are used to span nodes in different core rings. As described below, these link categories are specified in detail for the general case of a $2^\{R\}$ node canonical network framework.

A generalization of the 16 node canonical network framework to the case of $2^\{R\}$ nodes can now be described. A multi-step procedure will be used to specify the pairs of nodes that are connected by links corresponding to the $2^\{R\}$ node hyper-ring canonical network framework. The nodes connected by links will be referred to as link pairs. With a total of N nodes, there are $$\binom{N}{2} = \{N \text{ times } (N-1)\}/\{2\}$$

possible link pairs (that is, $O(N^\{2\})$ possible link pairs).

The $2^\{R\}$ node hyper-ring canonical network framework specification will consist of a sequence of \log N=R steps that will explicitly identify $2^\{R-1\}\times(\log\{2^\{R\}\}+2)$ link pairs (that is, $O(N\log\_\{2\}N)$ link pairs will be specified), each link pair of which is in one of three possible categories to be described below.

In general, a link pair corresponding to a link between node i and node j can be denoted by means of an unordered pair (i,j) or (j,i) (either being acceptable since the links in a canonical network framework are not directionalized). This notation can be extended so that more generally a 3 node ring of link pairs corresponding to a link between nodes i and j, and a link between nodes j and k, and a link between nodes k and i will be denoted as (i,j,k). This notation extends in the obvious way to rings of more than 3 nodes. It should be understood that regarding a ring of link pairs denoted as, say, (0,15,2,3), there is a link pair corresponding to each sequential pair of nodes in the expression for (0,15,2,3) and that the two end nodes (that is, nodes 0 and 3) have a wrap-around link. It should also be clear that the expression (3,2,15,0) denotes the same ring. (Rings with is directionalized links will later be denoted with a different expressional format.)

Given a non-directionalized ring, it is possible to traverse the ring (that is, find a path passing through each node in the ring exactly once) in either direction according to the ordering of the nodes in the ring expression. In such a traversal of the ring, each node in the ring will be said to have a predecessor and successor. For example, for the ring denoted as (0,15,2,3), when traversing the nodes in the ring from left to right according to their sequence in the ring expression, node 2's predecessor is node 15, and node 2's successor is node 3; if instead the ring were traversed from right to left according to their sequence in the ring expression, node 2's predecessor is node 3, and node 2's successor is node 15.

Consider a set of $2^{\{R\}}$ nodes. To initiate the specification of the link pairs in the $2^{\{R\}}$ node hyper-ring canonical network framework, the $2^{\{R\}}$ nodes will be partitioned into two disjoint sets of $2^{\{R-1\}}$ nodes. One set will be denoted as I and the other set as O. For reference and with no loss of generality, the $2^{\{R-1\}}$ nodes in I can be labeled from left to right in the order of the increasing odd numbers from 1 to $2^{\{R\}}-1$ (that is, I=\{1,3,5,7, . . . ,$2^{\{R\}}-3,2^{\{R\}}-1$\}). Similarly, the $2^{\{R-1\}}$ nodes in O can be labelled with the even numbers from 0 to $2^{\{R\}}-2$ (that is, O=\{0,2,4, 6,... ,$2^{\{R\}}-4,2^{\{R\}}-2$\}. This node labelling is illustrated in FIG. 18 for the case where R=$2^{\{5\}}$=32 nodes. It should be understood in the following that this particular node labelling is used only for convenience of reference, and, in fact, any node labeling could actually be used in specifying link pairs among the nodes.

To specify the link pairs in the canonical network framework, it must be possible to describe their placement within the structure. Doing so permits the conference resource assignment algorithm to determine a link's potential role in implementing a conference, as well as to be able to characterize the current state of the canonical network framework in terms of the utilized and available link connectivity. As illustrated above for the specific case of the 16 node canonical network framework, each of the link pairs in the canonical network framework will each be in one of three structural categories:

Link pairs associated with core rings: The core ring links provide direct connectivity among the 4 nodes in each of the core rings.

Link pairs associated with a ring connecting all the I nodes (called the I ring), and link pairs associated with a ring connecting all the O nodes (called the I ring): The links in the I ring and the links in the the O ring provide direct connectivity between each pair of adjacent core rings.

Link pairs from the I nodes to the O nodes that span nodes associated with pairs of core rings. In this case, in addition to the I node to I node and the O node to O node connectivity provided between the adjacent core rings, these spanning links connect I nodes to O nodes in core rings that are separated by a power of two number of intermediate rings.

The following \log N=R steps specify the link pairs in terms of the rings of nodes that comprise a $2^{\{R\}}$ node hyper-ring canonical network framework.

The specification of the link pairs that comprise the core rings of the hyper-ring canonical network framework has two parts.

Specification of the Core Rings:

Part (a): Form disjoint $2^{\{R-15\}}$ pairings of the nodes with one node in each link pair from I and the other node from O. With no loss of generality, these link pairs can be established by linking the first node in I (that is, node 15) with the first node in O (that is, node 0), and the second node in I (that is, node 3) with the second node in O (that is, node 2), and repeating this linking process until the last node in I is linked with the last node in O. This results in the link pairs: (15,0), (3,2), (5,4), (7,6) . . . ($2^{\{R\}}-3,2^{\{R\}}-4$), ($2^{\{R\}}-15,2^{\{R\}}-2$). This set of link pairs correspond to one-half of the link pairs in all of the core rings of canonical network framework.

Part (b): The remaining one-half of the link pairs in the core rings completes the ring connectivity as follows. Consider the first two adjacent link pairs established in Part (a). That is, consider adjacent link pairs (15,0) and (3,2). Cross link the I node in link pair (15,0) with the O node in link pair (3,2) resulting in link pair (15,2); similarly, cross link the O node in link pair (15,0) with (called the I ring) the I node in link pair (3,2) resulting in link pair (3,0). Together with the link pairs from Part (a), it can be seen that a ring has now been formed which can be denoted as (0,15,2,3). This ring will be referred to as the L_{0} ring of the core rings in the hyper-ring canonical network framework. Consider the next two adjacent pairs of the link pairs established in Part (a). That is, consider adjacent link pairs (5,4) and (7,6). Again, cross link the I node in link pair (5,4) with the O node in link pair (7,6) resulting in link pair (5,6); similarly, cross link the O node in link pair (5,4) with the I node in link pair (7,6) resulting in link pair (7,4). Together with the link pairs from Part (a), it can be seen that a ring has now been formed which can be denoted as (4,5,6,7). This ring will be referred to as the L_{15} ring of the core rings in the hyper-ring canonical network framework. This process should then be repeated for the next two adjacent link pairs established in Part (a) Continuing through all the adjacent pairs in I and O, the final level L_{$2^{\{R-2\}}-15$} ring in the ring core will be denoted as ($2^{\{R\}}-4,2^{\{R\}}-3,2^{\{R\}}-2,2^{\{R\}}-15$)\}.

Step 1 specifies the link pairs that comprise the $2^{\{R-2\}}-15$ levels of the core rings, denoted as L_{0},L_{15}, . . . L_{$2^{\{R-2\}}-15$}, in the hyper-ring canonical network framework. It should be noted that the core rings are comprised only of I nodes linked to O nodes, and O nodes linked to I nodes. Other variations could have been used as well. However, for consistency, this convention will be maintained in the description of the $2^{\{R\}}$ node canonical network framework.

It should also be understood that although the core rings specified by the link pairs in Step 15 each have a total of 4 nodes consisting of 2 nodes from I and 2 nodes from O, in general, the core rings could each have a total of p nodes consisting of p/2 nodes from 1 and p/2 nodes from O. The details of the link pair specifications for the spanning rings to be described in Steps 3 to R below would then change, but the fundamental concepts underlying the link pair specifications would remain the same.

The I ring corresponds to a set of link pairs comprised only of nodes in I. The O ring corresponds to a set of link pairs comprised only of nodes in O.

Step 2. Specification of the I and O Rings:

Part (a): Each node in I is a member of exactly two link pairs comprising the I ring. The link pairs established in Step 15 provide a structure to the core rings that influence the structure of the I ring (and the O ring). The ordering of the nodes in the I ring expression contains a "skip" of the odd number labeled nodes in I together with a alteration in the form of "no-skip" and a "double-skip" regarding the successors in the sequence to the $2^{\{R\}}-3$ node and the $2^{\{R\}}-15$ node. More specifically, the I ring can be expressed as (1, 5, 9, . . . , $2^{\{R\}}-7$, $2^{\{R\}}-3$, 3, 7, 11, . . . , $2^{\{R\}}-5$, $2^{\{R\}}-15$). Note that the pattern corresponding to (\dots $2^{\{R\}}-3$, 3, . . . . represents a double-skip regarding the successor of $2^{R}-3$. Similarly, the pattern corresponding to ( ... $2^{R}-1, 1, ...$ ) represents a no-skip regarding the successor of $2^{R}-5$.

Part (b): Each node in O is a member of exactly two link pairs comprising the O ring. The ordering of the even numbered labeled nodes in the O ring expression contains a similar "skip," together with an alteration in the form of a no-skip and a double-skip as was seen in Part (a) for the I ring. More specifically, the O ring can be expressed as (0, 4, 8, ... $2^{R}-4, 2, 6, 10, ..., 2^{R}-2$). Note that the pattern corresponding to ( ... $2^{R}-2, 0, ...$ ) represents a no-skip regarding the successor of $2^{R}-2$. Similarly, the pattern corresponding to ( ... $2^{R}-4, 2, ...$ ) represents a double-skip regarding the successor of $2^{R}-4$.

FIG. 18 illustrates the resulting link pairs establishing the O ring and the I ring for Step 2 for a $2^{5}=32$ node canonical network framework. It can be seen that the I nodes and the O nodes provide connectivity between all adjacent rings in the ring core. This connectivity is established by linking the I nodes to the I nodes and by linking the O nodes to the O nodes. This provides larger rings of nodes to be established as combinations of core ring nodes. For example note that from FIG. 17 and FIG. 18, by means of the link pairs of core rings L_{3} and L_{4}, and the I ring links and the O ring links connecting L_{3} and L_{4}, the 8 node ring (13, 17,16,19,18,14,15,12) can be utilized. Essentially, these link pairs permit the two 4 node rings L_{3} and L_{4} to be merged into an 8 node ring. This ring merging capability for the $2^{R}$ node canonical network framework will be seen to be further enhanced by means the spanning links. The merging of nodes of combinations of core rings will be the essence of the conference resource assignment algorithms for multipoint to multipoint multicasting in generic conferencing applications.

Step 3. Specification of the Spanning Links:

In general, for a $2^{R}$ node canonical hyper-ring framework, there are $2^{R-2}$ core rings, each comprised of 4 Processing Element nodes. The core ring adjacencies provided by spanning links can be specified as follows:

For the even-numbered core rings L_{i}, i=0,2,4, \dots, $2^{R-2}-2$:

Each pair of (twisted or parallel) spanning links from the even-numbered nodes in L_{i} spans to the odd-numbered nodes in core rings L_{i+1}, L_{i+3}, L_{i+7}, ... , L_{i+$2^{R-1}$-1}, where all arithmetic is performed modulo $2^{R-2}$.

Each pair of (twisted or parallel) spanning links from the odd-numbered nodes in L_{i} spans to the even-numbered nodes in core rings L_{i+1}, L_{i+3}, L_{i+7}..., L_{i+$2^{R-1}$-1}, where all arithmetic is performed modulo $2^{R-2}$.

For the Odd-Numbered Core Rings L_{i}, i=1,3, 5, ... ,$2^{R-2}$1:

Each pair of (twisted or parallel) spanning links from the even-numbered nodes in L_{i} spans to the odd-numbered nodes in core rings L_{i-1}, L_{i-3}, L_{i-7}, ... , L_{i+$2^{R-1}$-2}, where all arithmetic is performed modulo $2^{R-2}$.

Each pair of (twisted or parallel) spanning links from the odd-numbered nodes in L_{i} spans to the even-numbered nodes in core rings L_{i-1}, L_{i-3}, L_{i-7}, ... , L_{i+$2^{R-1}$-2}, where all arithmetic is performed modulo $2^{R-2}$.

In summary, in the $2^{R}$ node canonical hyper-ring framework, each of the even-numbered core rings L_{i}, i=0, 2, ... , $2^{R-2}-2$ has spanning links creating adjacencies with each of the odd-numbered core rings L_{i+($2^{j}-1$)}, for j=1, 2, ..., R-3, R-2. Similarly, each of the odd-numbered core rings L_{i}, i=1, 3, ..., $2^{R-2}-1$ has spanning links creating adjacencies with each of the even-numbered core rings L_{i-($2^{j}-1$)}, for j=1, 2, ..., R-3, R-2. In each case, the spanning links connect odd-numbered nodes to even-numbered nodes with twisted or parallel link patterns.

When the establishment of an N-party conference is requested by a set of N external conference participants, an assignment of Processing Elements and associated interconnecting links in the hyper-ring must be made to support the conference. This is accomplished using a conference resource assignment algorithm. The resulting conference resource assignment of Processing Elements and links can be viewed as a conference implementation. In general, each conference participant must be assigned two Processing Elements in the hyper-ring: one Processing Element to serve as an Input Source Unit to the hyper-ring for the transmission of content (voice, video, graphics, data, ... ) from the conference participant, and another Processing Element to serve as an Output Destination Unit from the hyper-ring for the transmission of content to the conference participant.

The content provided by a conference participant must be transmitted from the Input Source Unit assigned to the conference participant to each of the Output Destination Units of the other conference participants. This content will be packaged and formatted by each Input Source Unit as a generic content packet. The content packets will be assumed to have source and destination address header fields such that routing operations can be performed. Hence, for the collection of Processing Elements assigned to a conference, there must exist an available route comprised of Processing Elements and their interconnecting links such that a directed path exists for a content packet transmission from the Input Source Unit of a given conference participant to the Output Destination Units of each of the other conference participants.

It is possible for the interconnection of Processing Elements by links supporting a conference to have various structures. For example, the structure of the Processing Elements and links could be a sequence of Processing Elements in the form of a Processing Element path or a Processing Element tree. Alternatively, the structure of the Processing Elements and links could be a sequence of Processing Elements in the form of a Processing Element ring. The $2^{R}$ node canonical hyper-ring framework represented by a hyper-ring can provide both such Processing Element interconnection structures.

Figure 2:
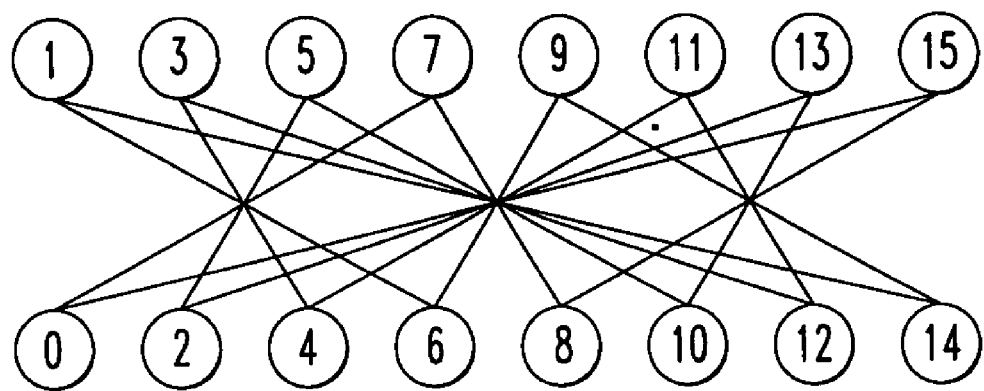
FIG. 2 shows an example of a $2^{\{R=4\}}=16$ node canonical hyper-ring framework using twisted spanning links.

The $2^{R=4}=16$ node canonical hyper-ring framework as shown in FIG. 1 will serve as an example for describing a conference resource assignment algorithm for implementing conferences. Recall that the $2^{R}$ node canonical hyper-ring framework is comprised of 4 core rings of 4 nodes each and denoted as L_{0}, L_{1}, L_{2}, L_{3}; the $2^{R}$ node canonical hyper-ring framework also has 16 spanning links connecting the core rings. These spanning links can be of the so-called "parallel" and "twisted" pattern varieties. In FIG. 1, only "parallel" spanning links are utilized between the core rings. In FIG. 2, only "twisted" spanning links are utilized between the core rings.

Depending on the particular types and combinations of spanning links utilized between the core rings, many other alternative hyper-ring structures could be shown. For the purposes of the discussions in the following sections regarding resource assignments for conference implementations, the all-parallel spanning link structure will be utilized as shown in FIG. 1. It should be understood that any of the alternative 2^{R} node canonical hyper-ring frameworks could also have been used for the purpose of describing a conference resource assignment algorithm. In each case, while the particular spanning link patterns would influence the details of the conference resource assignment algorithm, the fundamental underlying strategies of the conference resource assignment algorithms would remain essentially the same.

FIG. 1 shows an example of a 2^{R=4}=16 node canonical hyper-ring framework. The directionality of content flow for each link can be programmed. Only so-called "parallel" spanning links are utilized between the 4 core rings. In general, each node can be configured to serve a conference participant as either an Input Source Unit or an Output Destination Unit (but not both).

FIG. 2 shows an example of a 2^{R=4}=16 node canonical hyper-ring framework. The directionality of content flow for each link can be programmed. Only so-called "twisted" spanning links are utilized between the 4 core rings. In general, each node can be configured to serve a conference participant as either an Input Source Unit or an Output Destination Unit (but not both).

Figure 3:
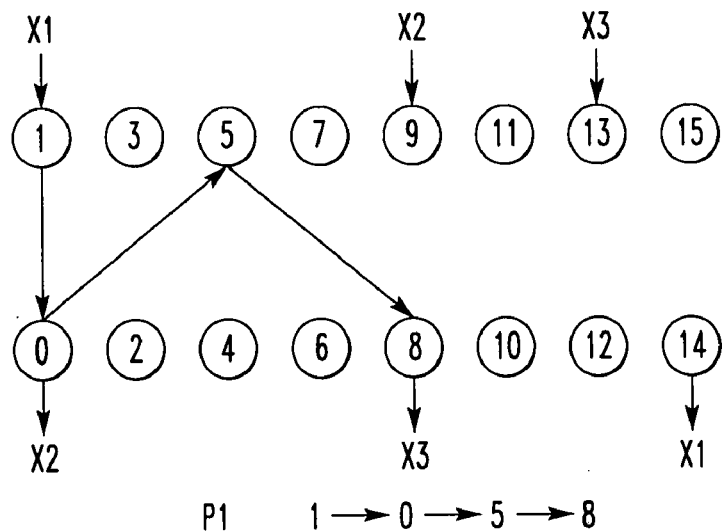
FIG. 3 shows an example of a 3 Processing Element paths within the $2^{\{R=4\}}=16$ node canonical hyper-ring framework.
Figure 3:
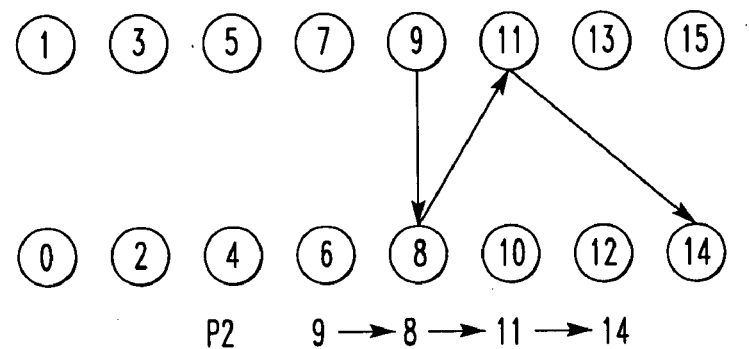
Figure 3:
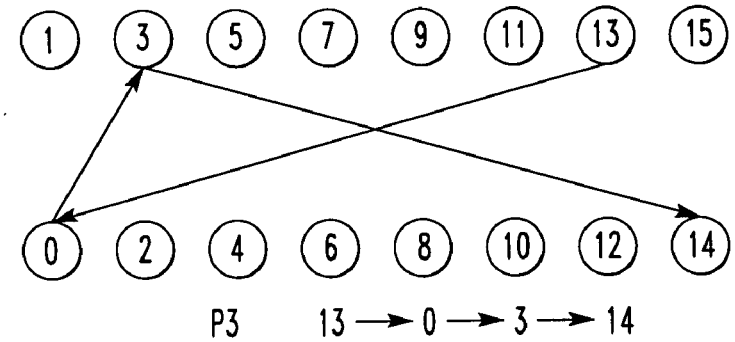

The simplest structure of a conference implementation will be comprised of set of Processing Element paths, each of which is denoted as a sequence of Processing Element units and interconnecting links. For example, in FIG. 1, a processing element path denoted as PathX1=1->0->5->8 could provide a connecting path from Processing Element 1 to Processing Elements 2, 5, and 8. This is depicted in FIG. 3. Another Processing Element path shown in FIG. 3 is PathX2=9->8->11->14. Finally, a third Processing Element path shown in FIG. 3 is PathX3=13->0->3->14.

In a conference implementation, each Processing Element path will usually begin with a Processing Element assigned as the Input Source Unit to one of the conference participants, and will traverse a subset of the other Processing Element units in the hyper-ring via directed links such that each of the Processing Element units assigned as a Output Destination Unit of other conference participants will be reached exactly once. In general, this Processing Element path might also traverse other Processing Elements as well. There are no loops or branch points in a Processing Element path. A Processing Element path from each conference participant can be utilized to transmit the input content stream from a conference participant to all the other conference participants. Consider a conference denoted as Conference X with conference participants X1, X2, and X3. Suppose that in FIG. 3:

Processing Element 1 was assigned to be the Input Source Unit of conference participant X1, and Processing Element 14 was assigned to be the Output Destination Unit of X1;

Processing Element 9 was assigned to be the Input Source Unit of conference participant X2, and Processing Element 0 was assigned to be the Output Destination Unit of X2;

Processing Element 13 was assigned to be the Input Source Unit of conference participant X3 and Processing Element 8 was assigned to be the Output Destination Unit of X3.

Then the 3 Processing Element paths, PathX1, PathX2, and PathX3, shown in FIG. 3 would together implement a 3-party conference among X1, X2, and X3.

FIG. 3 shows an example of a 3 Processing Element paths within the 2^{R=4}=16 node canonical hyper-ring framework. The Processing Element path PathX1 can be denoted as PathX1=1->0->5->8. The Processing Element path PathX2 can be denoted as PathX2=13->8->5->0. The Processing Element path PathX3 can be denoted as PathX3=13->0->3->14. The 3 Processing Element paths shown would implement a 3-party conference among X1, X2, and X3.

Figure 4A:
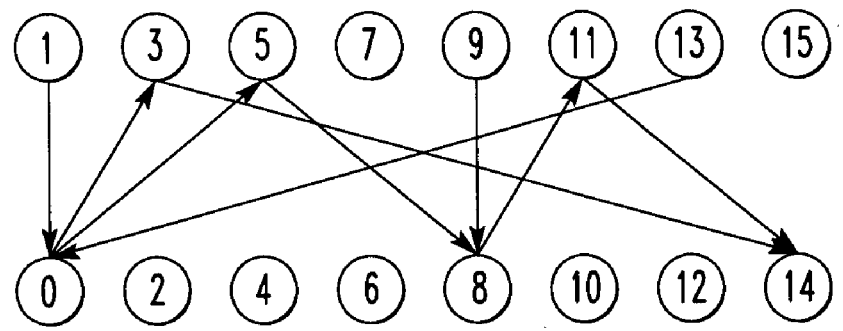
FIG. 4(*a*) shows a superposition of the 3 Processing Element paths within the $2^{\{R=4\}}=16$ node canonical hyper-ring framework shown in FIG. 3 to form a Processing Element tree to implement a conference implement a 3-party conference among conference participants X1, X2, and X3.

A Processing Element tree is a combination of superimposed Processing Element paths. The 3 Processing Element paths, PathX1, PathX2, and PathX3 shown in FIG. 3 would together represent a Processing Element tree as shown in FIG. 4(a). Note that there are no loops or cycles in a Processing Element tree. However, in general, there can be a Processing Element that serves as a branch point in a Processing Element tree. The branch point Processing Element units of a Processing Element tree can be viewed as the intersections of the Processing Elements of the superimposed Processing Element paths.

Figure 4B:
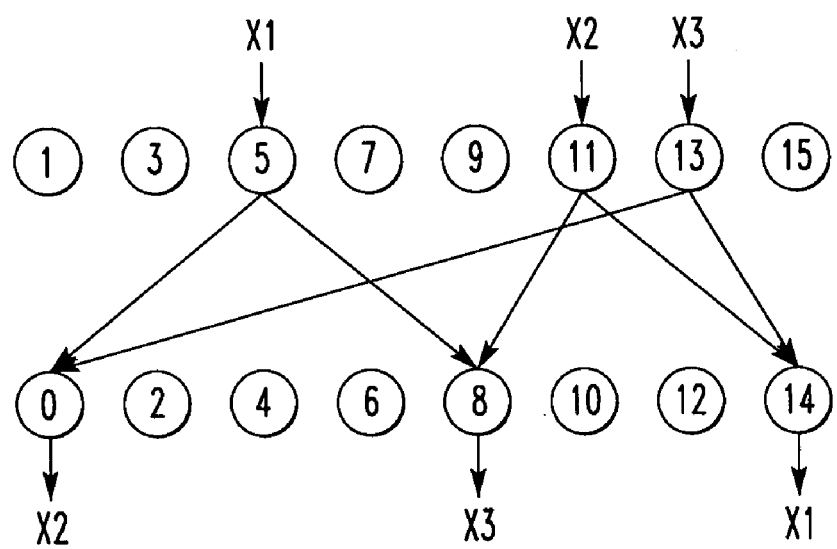

When the input content streams associated with a conference implementation enter a Processing Element operating as a branch point within its Processing Element tree, the input content stream must be replicated or multicast to all nearest neighbor Processing Element units in the Processing Element tree reachable from the branch point. The multicasting operation taking place at a branch point Processing Element can cause a queuing of the content packets and subsequent delay. However, a potential advantage to the use of branch points in a Processing Element tree is that a branch point Processing Element can sometimes be utilized to provide an overall reduced path length regarding any Processing Element path in the tree that would have to be traversed. FIG. 4(b) shows a Processing Element tree in which the Processing Elements assigned as Input Source Units operate as branch points.

FIG. 4(a) shows a superposition of the 3 Processing Element paths within the 2^{R=4}=16 node canonical hyper-ring framework shown in FIG. 3 to form a Processing Element tree to implement a conference implement a 3-party conference among conference participants X1, X2, and X3. FIG. 4(b) shows an alternative Processing Element tree in which the Processing Elements assigned as Input Source Units operate as branch points.

A Processing Element ring in a hyper-ring can be viewed as a sequence of Processing Elements connected by links with a common direction that collectively form a closed path of Processing Elements which can be circuitously traversed from any Processing Element back to itself while reaching each of the other Processing Elements on the ring exactly once.

In general, to implement a conference, a single Processing Element ring could be used or multiple intersecting Processing Element rings could be used. In the following, the case where a single ring within the hyper-ring is utilized to implement a conference will be primarily considered. The case where multiple intersecting rings are used will follow directly from this discussion.

Figure 5A:
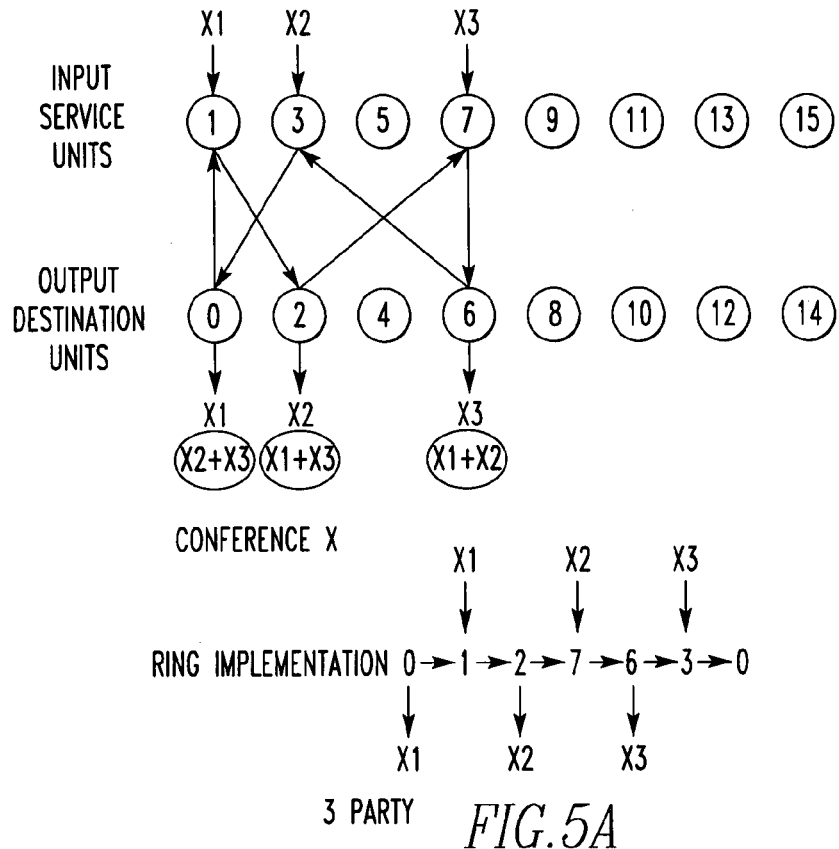
FIG. 5(*b*) shows a 2-party conference denoted as Conference Y is implemented by means of RingY=(8->9->12->13->8).

An N-party conference could be implemented by means of a 2N Processing Element ring (assuming each Processing Element can be assigned to only serve as an Input Source Unit or a Output Destination Unit). The input content streams from any specific Processing Element operating as an Input Source Unit would have to pass-through each of the N−1 Processing Elements used as Input Source Units between itself and the most distant Output Destination Unit assigned to one of the other N−1 conference participants on the ring. Intermediate to this most distant Output Destination Unit may or may not be other Processing Elements operating as Input Source Units for the other conference participants; this would depend on the sequence of Output Destination Units and Input Source Units on the ring. This is illustrated on the 2^{R=4}=16 node canonical hyper-ring framework of a hyper-ring shown in FIG. 1 for the case of a 3-party conference. As seen in FIG. 5(a), a ring of 6 Processing Elements is assigned to implement a 3-party conference denoted as Conference X. The 3 conference participants are denoted as X1, X2, and X3. It can be seen that Conference X has been assigned a 6 Processing Element ring denoted as RingX=(0->1->2->7->6->3->0).

As Indicated in FIG. 5(a):

Conference participant X1 uses Processing Element 1 as its Input Source Unit and Processing Element 0 as its Output Destination Unit. Content packets from X1 enter the hyper-ring at Processing Element 1 and are transmitted via the ring to Processing Element 2 (which is X2's Output Destination Unit) and Processing Element 6 (which is X3's Output Destination Unit).

Conference participant X2 uses Processing Element 3 as its Input Source Unit and Processing Element 2 as its Output Destination Unit. Content packets from X2 enter the hyper-ring at Processing Element 3 and are transmitted via the ring to Processing Element 0 (which is X1's Output Destination Unit) and Processing Element 6 (which is X3's Output Destination Unit).

Conference participant X3 uses Processing Element 7 as its Input Source Unit and Processing Element 6 as its Output Destination Unit. Content packets from X3 enter the hyper-ring at Processing Element 7 and are transmitted via the ring to Processing Element 2 (which is X2's Output Destination Unit) and Processing Element 0 (which is X1's Output Destination Unit).

Figure 5B:
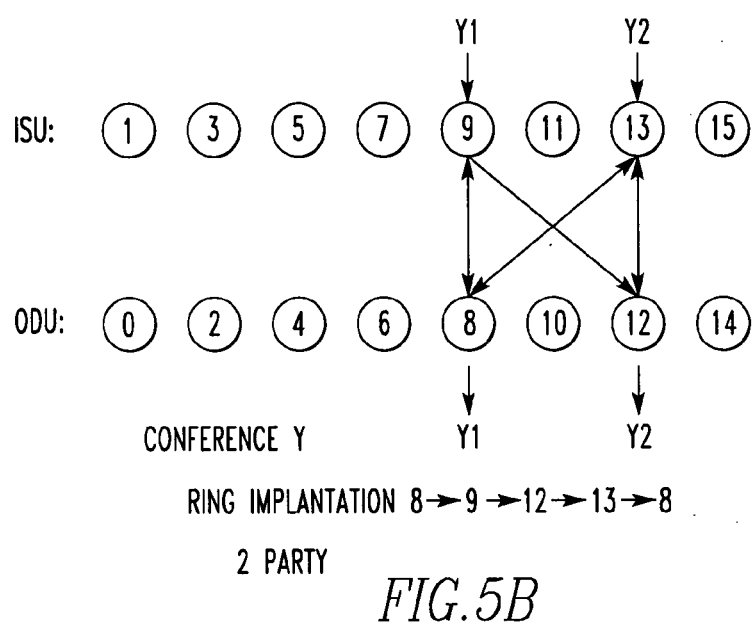

Suppose now that on the hyper-ring of Figure \ref{16 hr} currently supporting Conference X, an additional 2-party Conference Y with conference participants Y1 and Y2 must also be implemented. This can be accomplished using a 4 Processing Element ring denoted as RingY=(9->8->13->12->9) as shown in FIG. 5(b). It should be noted that the implementations of conferences X and Y are disjoint in terms of Processing Element and link assignments.

FIG. 5 shows using a 2^{R=4}=16 node canonical hyper-ring framework of a hyper-ring, a resource assignment has been made such that 3 conferences are concurrently implemented by means of three rings. Within each ring, each odd numbered Processing Element is used as a Input Source Unit from a conference participant and each even numbered Processing Element is used as an Output Destination Unit to a conference participant. FIG. 5(a) shows a 3-party conference denoted as Conference X is implemented by means of RingX=(0->1->2->7->6->3->0). FIG. 5(b) shows a 2-party conference denoted as Conference Y is implemented by means of RingY=(8->9->12->13->8). FIG. 5(c) shows a 3-party conference denoted as Conference Z is implemented by means of RingZ=(5->4->7->10->15->14->11->8->5).

It should also be noted that the 2 concurrent implementations of Conference X and Conference Y use no common Processing Elements or links, but Conference Z shares Processing Element 7 with Conference X and Processing Element 8 with Conference Y. Conference Z utilizes these Processing Elements as Pass-Through Units.

When two or more conference implementations share a Processing Element, one of the conferences will in general be using that Processing Element as either an Input Source Unit or an Output Destination Unit, and the other conference will be using that Processing Element in a routing capacity. The Processing Element will have the primary assignment of supporting the conference to which it is assigned as an Input Source Unit or an Output Destination Unit. From the perspective of the other conferences passing content packets through that Processing Element, it will be said to be operating as a Pass-Through Unit. Accordingly, a Pass-Through Unit in a conference implementation can be defined as a Processing Element that is a component of the ring (or path or tree) supporting the conference but not being used as either a Input Source Unit or an Output Destination Unit in the conference.

Associated with the sharing of Processing Elements by different conferences is the sharing of a link by different conferences. When two Pass-Through Units in a conference are connected by a link over which content packets pass that pertain to the conference(s) to which the Processing Elements have been primarily assigned as either Input Source Units or Output Destination Units as well as other content packets that pertain to the conference(s) for which the Processing Elements are operating as Pass-Through Units, then from the perspective of those latter conferences that link will be said to be operating as a Pass-Through link.

Associated with the use of two or more directly linked Processing Elements as Pass-Through Units is the additional sharing of bandwidth on the connecting links by two or more conference implementations. When content packet transmissions associated with two or more conference implementations share the bandwidth of a link, that link will be said to be operating as a Pass-Through link relative to all but one of those conference implementations.

Consider a given conference implementation on a hyper-ring. From the perspective of that particular conference, a Processing Element primarily assigned as an Input Source Unit or an Output Destination Unit, the functional capabilities and link bandwidth related to the links incident to that Processing Element are expected to be dedicated towards the support of that conference. But if that same Processing Element is also being employed as a Pass-Through Unit by another conference, this Processing Element must also provide a routing function regarding content packets passing through it associated with another conferences. Thus, the overall performance of that Processing Element will in general be reduced to some extent relative to the primary assigned conference. This reduction in performance can be in the form of increased delays in content packet transfers among the Processing Elements with the primary assignment of supporting the conference, or even content packet loss if the buffers used to queue the content packets overflow.

As an example of the use of Pass-Through Units, suppose that in addition to Conferences X and Y for which disjoint implementations are shown in FIGS. 5(a) and 5(b), another 3-party Conference Z with conference participants Z1, Z2, and Z3 must also be implemented. Recall that the implementations of Conferences X and Y have utilized a total of 10 of the 16 Processing Elements and 10 of the 32 links in the 2^{R=4}=16 node canonical hyper-ring framework of a hyper-ring structure as shown in FIG. 1. Hence, the necessary 6 unassigned Processing Elements are available together with 22 unused links for the assignment of a ring to Conference Z.

Figure 5C:
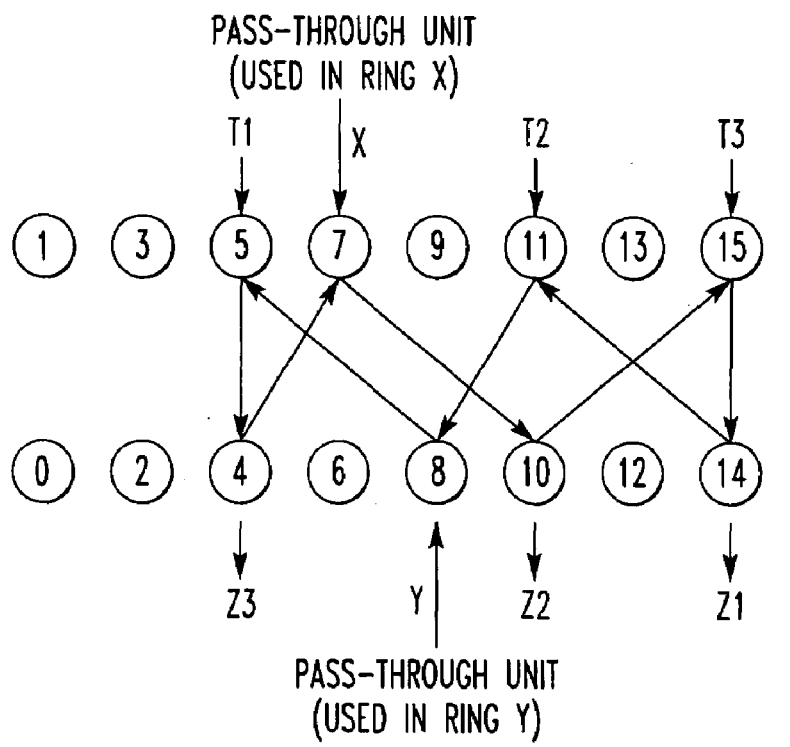
Figure 5C:
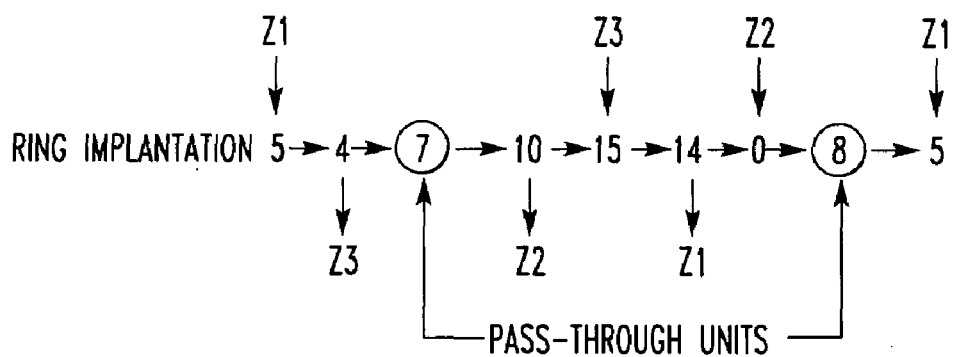

An implementation of 3-party conference Z with conference participants Z1, Z2, and Z3 is shown in FIG. 5(c). A 6 Processing Element ring implementation is shown denoted as RingZ=(5->4->7->10->15->14->11->8->5). Unlike the RingX and RingY mutually disjoint implementations of conferences X and Y respectively shown in FIGS. 5(a) and 5(b), the RingZ implementation of Conference Z can be seen to use Processing Elements 7 and 8 as Pass-Through Units. More particularly, it can be seen that:

Processing Element 7 used in RingZ has already been assigned to conference participant X3 in Conference X as an Input Source Unit;

Processing Element 8 used in RingZ has already been assigned to conference participant Y2 in Conference Y as an Output Destination Unit.

It is interesting to note that while the RingZ in FIG. 5 uses 2 Pass-Through Units, it does not use any Pass-Through links, since no links are sharing bandwidth among multiple conferences. Hence while the processing capabilities of the conference implementations represented by RingX or RingY have been reduced relative to support of Conferences X and Y since the Processing Elements 7 and 8 are now also operating as routers relative to Conference Z, the bandwidth of the links of RingX and RingY is not being shared with RingZ. Hence, the use of Pass-Through Units does not in general necessarily also imply the use of Pass-Through links.

Figure 6:
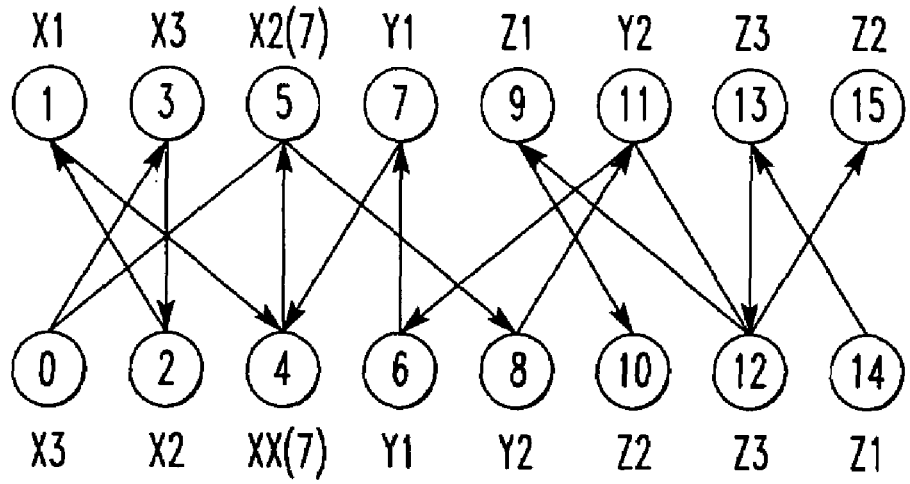
FIG. 6(*a*) shows a 3-party conference denoted as Conference X is implemented by means of RingX=(1->4->5->0->3->2->1).

As an additional example of an implementation of the 3-party Conference X, the 2-party Conference Y, and the 3-party Conference Z that does utilize both Pass-Through Units and Pass-Through links, FIG. 6 shows the following:

3-party Conference X is implemented by RingX=(1-->4-->5-->0-->3-->2-->1);

2-party Conference Y is implemented by RingY (6->7->4->5->8->11->6);

3-party Conference Z is implemented by RingZ =(9->10->15->14->13->12->9).

It can be seen that Processing Element 5 is a Input Source Unit for Conference X and Processing Element 4 is an Output Destination Unit for Conference X, and both Processing Elements are also utilized as Pass-Through Units for Conference Y, and furthermore link 4->5 which is used in the Conference X implementation also serves as a Pass-Through link for the Conference Y implementation.

FIG. 6 shows using a $2^{\{R=4\}}=16$ node canonical hyper-ring framework, a resource assignment has been made such that 3 conferences are concurrently implemented by means of three rings. In FIG. 6(*a*), a 3-party conference denoted as Conference X is implemented by means of RingX=(1->4->5->0->3->2->1). In FIG. 6(*b*), a 2-party conference denoted as Conference Y is implemented by means of RingY=(6->7->4->5->8->11->6). In FIG. 6(*c*), a 3-party conference denoted as Conference Z is implemented by means of RingZ=(9->10->15->14->13->12->9). Note that Processing Element 5 is a Input Source Unit for Conference X and Processing Element 4 is an Output Destination Unit for Conference X, and both Processing Elements are also utilized as Pass-Through Units for Conference Y, and furthermore link 4->5 which is used in the Conference X implementation also serves as a Pass-Through link for the Conference Y implementation.

Figure 7:
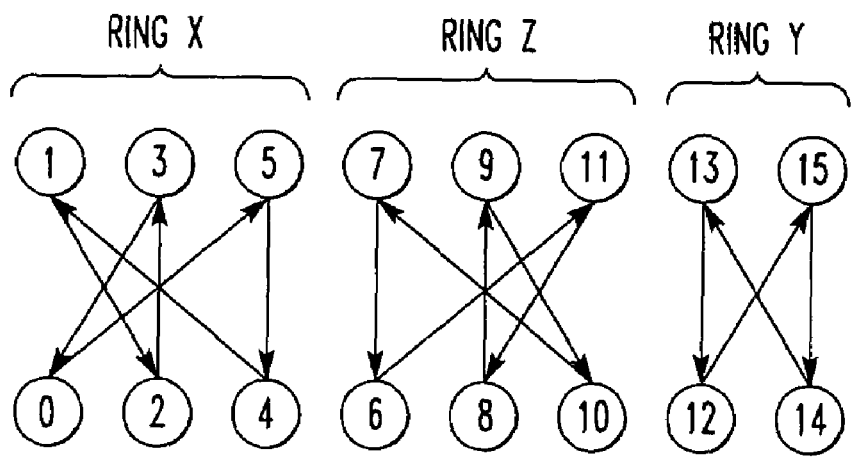
FIG. 7 shows a $2^{\{R=4\}}=16$ node canonical hyper-ring framework of a hyper-ring where mutually disjoint resource assignments have been such that two 3-party conferences and a 2-party conference are concurrently implemented without using Pass-Through Units or Pass-Through links.

It should be pointed out that it is possible to concurrently implement two 3-party conferences and a 2-party conference using the $2^{\{R=4\}}=16$ node canonical hyper-ring framework of a hyper-ring without using Pass-Through Units or Pass-Through links. This is illustrated in FIG. 7. FIG. 7 shows a $2^{\{R=4\}}=16$ node canonical hyper-ring framework of a hyper-ring where mutually disjoint resource assignments have been such that two 3-party conferences and a 2-party conference are concurrently implemented without using Pass-Through Units or Pass-Through links.

In conclusion, the use of a Processing Element as a Pass-Through Unit or the sharing of bandwidth on a Pass-Through link in order to support a conference has an impact on the quality of service provided to the conference participants and should ideally be avoided by the conference resource assignment algorithm. Indeed, if possible, each Processing Element ring assigned to support conference should be completely disjoint from all other Processing Element rings in the hyper-ring. Moreover, if there were no limitations to the use of Pass-Through Units or Pass-Through links, a conference resource assignment algorithm could arbitrarily connect together any combination of assigned and idle Processing Elements to provide a conference implementation, essentially rendering any priority strategy as being meaningless.

Various options are available regarding priority criteria utilized by the conference resource assignment algorithm in order to implement a conference using Processing Element rings and associated links. For example, one possible resource assignment criterion would be to minimize the use of Pass-Through Units and Pass-Through links and attempt to maximize the extent to which concurrent conference implementations are disjoint regarding the sharing of common conference resources. Alternatively, minimizing the number of links traversed by any content packet from an Input Source Unit to the appropriate Output Destination Units might be utilized as a conference resource assignment algorithm priority criteria. Minimizing the total or average number of links in content packet routes might require robust use of Pass-Through Units and Pass-Through links. In general, the extent to which Processing Elements and links can be shared by concurrently implementated conferences is a critical factor regarding the use of conference resource assignment algorithms.

Another criteria for a conference resource assignment algorithm relates to the average length of routes taken by content packets from an Input Source Unit to all the appropriate Output Destination Units. A greedy resource assignment approach could be utilized such that the time delay from a conference request to the resource assignment and implementation was viewed as exceedingly important to an application, and accordingly the first feasible assignment that was determined as functionally satisfactory by a conference resource assignment algorithm would be immediately employed.

Within an implemented conference in a hyper-ring, there will be some number of links over which the content packets from each of the Processing Elements serving as a Input Source Unit will be transmitted to each of the other Processing Elements serving as a Output Destination Unit in the conference implementation. Between each Input Source Unit and Output Destination Unit in a content packet route the total number of links traversed will be referred to as the link-hop distance. Link-hop distance is clearly directly related to delay and bandwidth usage regarding content packet delivery over the hyper-ring, and therefore represents an important performance metric with which to assess the quality of a hyper-ring's support of conferences.

In the Implementation of Conference X in FIG. 5(*a*), the Relevant Link-Hop Distances are as Follows:

Conference participant X1 using Processing Element 1 as its Input Source Unit has a link-hop distance of 1 to Processing Element 2 which is X2's Output Destination Unit and a link-hop distance of 3 to Processing Element 6 which is X3's Output Destination Unit.

Conference participant X2 using Processing Element 3 as its Input Source Unit has a link-hop distance of 1 to Processing Element 0 which is X1's Output Destination Unit and a link-hop distance of 5 to Processing Element 6 which is X3's Output Destination Unit.

Conference participant X3 using Processing Element 7 as its Input Source Unit has a link-hop distance of 3 to Processing Element 0 which is X1's Output Destination Unit and a link-hop distance of 5 to Processing Element 2 which is X2's Output Destination Unit.

In a conference implementation, the average of all the link-hop distances between each conference participant's Input Source Unit and all the Output Destination Units of the other conference participants will be referred to as the {\bf average link-hop distance of the conference implementation.}. Based on the above observations regarding RingX, the average link-hop distance for the RingX implementation of Conference X, denoted as alhd(RingX), is [alhd(RingX) ={1+3+1+5+3+5}/{6}=3].

Figure 8B:
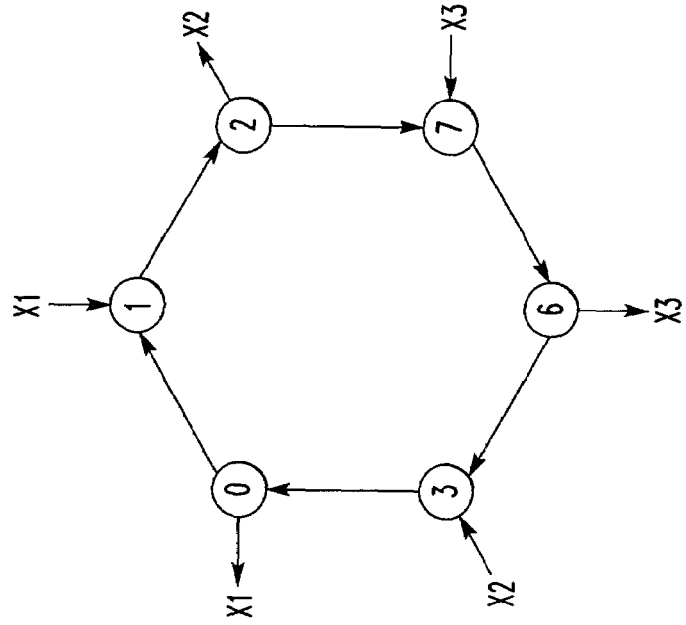
FIG. 8 shows such a mutually disjoint assignment for Conference X.
Figure 8A:
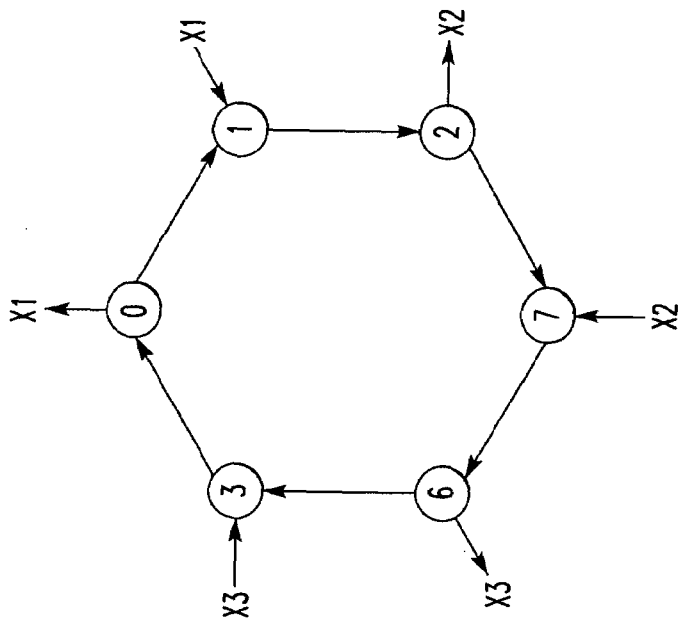

The RingX assignment for the Conference X implementation shown in FIG. 5(*a*) is not minimal in that an alternative assignment can be made with a average link-hop distance of 2 instead of 3. FIG. 8 shows such an assignment for Conference X.

It should be noted from Figure \ref{linkhop} that in the alternative RingX implementation of 3-party Conference X that each Processing Element serving a conference participant as an Input Source Unit is preceded on the ring by the Processing Element serving that same conference participant as an Output Destination Unit. In general, a ring implementation adhering to this Processing Element assignment rule will always have the minimal average link-hop distance possible. Furthermore, it can be shown that for an N-party conference implementation on a ring with 2N Processing Elements, the minimal average link-hop distance resulting from using this rule is N−1.

Minimum average link hop distance rule: Each Processing Element serving a conference participant as an Input Source Unit should be preceded on the ring by the Processing Element serving that same conference participant as an Output Destination Unit.

In RingX of FIG. 5(*a*), the route of the content packets from X1 to X2 requires 1 link-hop and the route to X3 requires 3 link-hops. Thus, the average link-hop distance that a content packet from X1 makes to get from the Input Source Unit where it enters the ring to each of the Output Destination Units of the other conference participants is 2 ring hops.

Regarding the removal of a content packet from continuing its traversal around a ring after all the appropriate Output Destination Units had been reached, a number of simple operational practices could be used. For example, in RingX of FIG. 5(*a*), when a content packet that had entered the ring from, say, X1's Input Source Unit, (that is, from Processing Element 1) traverses the entire RingX and returns to Processing Element 1, by means of a source address field that would be included in the content packet header, this content packet could be recognized by Processing Element 1 and would be removed so as to not be further transmitted on RingX.

Alternatively, when that content packet from X1's Input Source Unit, (that is, Processing Element 1) reached Processing Element 6 which is X3's Output Destination Unit and the final Output Destination Unit in RingX that must be reached by this packet, Processing Element 6 could remove it from the ring. This latter alternative would have the advantage of not requiring that Processing Element 6 burdened by the need of having to forward the content packet to Processing Element 1 for its removal from RingX. However, it imposes the added complexity that each node in a ring would have to know the identity of the successor node. Because of this complexity, it will be assumed in the following discussions that each node removes its own content packets from the ring.

The odd numbered Processing Elements in the ring are serving as Input Source Units and the even numbered Processing Elements in the ring are serving as Output Destination Units in this conference implementation. It can be seen that different resource assignments of Input Source Units and Output Destination Units to conference participants on a ring can have different average link-hop distance values for the resulting conference implementations. It should be clear that this assignment is actually arbitrary relative to the hyper-ring since any 3 of the Processing Elements in RingX could be the Input Source Units and the other 3 Processing Elements could be the Output Destination Units. However, it is possible that in some applications, the Processing Elements programmed to operate as Input Source Units or Output Destination Units might be influenced by external accessibility restrictions to the Processing Elements imposed on the conference participants. Also, it should be clear that the use of Pass-Through Units can increase the average link-hop distance of a conference implementation.

FIG. 8 shows two assignments of Input Source Units and Output Destination Units on a 6 Processing Element ring for a 3-party Conference X implementation with conference participants X1, X2, and X3. Note that in resource assignment (a) the average link-hop distance is 2, and in resource assignment (b) corresponding to the Conference X implementation shown in FIG. 5(*a*), the average link-hop distance is 3. Resource assignment (a) follows the minimal average link-hop distance rule, and accordingly for the 3-party Conference X, the alhd(RingX)=3−1=2.

The sequence of Processing Elements serving as Input Source Units and Output Destination Units alternates that Conference X is comprised of 3 conference participants. Each must be assigned an Input Source Unit and an Output Destination Unit. It should also be noted that the 2 concurrent implementations of Conference X and Conference Y use no common Processing Elements or links. Also, the implementations of Conferences X and Y have utilized a total of 10 of the 16 Processing Elements and 10 of the 32 links in the $2^{\{R=4\}}=16$ node canonical hyper-ring framework of a hyper-ring.

The combination of implementations of a 3-party Conference X, a 2-party Conference Y, and a 3-party Conference Z together utilize all 16 of the Processing Elements in the $2^{\{R=4\}}=16$ node canonical hyper-ring framework. Such a set of concurrent conferences can generically be referred to as a (3,3,2)-conference set. FIG. 7 illustrates that a $2^{\{R=4\}}=16$ node canonical hyper-ring framework can provide mutually disjoint implementations for each of the conferences comprising the (3,3,2)-conference set.

More generally, With 16 Processing Elements in the hyper-ring and therefore a maximum of 8 conference participants in all the conferences concurrently implemented, there are a total of 7 distinct generic conference sets:

(2,2,2,2)-conference set
(3,3,2)-conference set
(4,2,2)-conference set
(4,4)-conference set
(5,3)-conference set
(6,2)-conference set
(8)-conference set In addition to the disjoint implementations in the (3,3,2)-conference set, it can further be shown that all 7 of these generic conference sets can be implementated on mutually disjoint rings within the hyper-ring without the use of Pass-Through Units or Pass-Through links. This is illustrated in FIG. 9.

It is important to note that each of the disjoint implementations of the 7 generic conference sets illustrated in FIG. 9 represents only an example of a disjoint implementation. It should be clear that many possible disjoint implementation examples are possible. For example, note that the illustration of the 10-node ring supporting a 5-party conference in FIG. 9(e) utilizes 3 adjacent core rings in the 16 node hyper-ring such that all 4 Processing Elements are used on two of the core rings (namely, core rings $L\_\{0\}$, $L\_\{1\}$) and 2 of the 4 Processing Elements are used on the remaining core ring (namely $L\_\{2\}$). However, it can be shown that actually any 3 adjacent 4-node core rings where two of the core rings had all idle Processing Elements and the remaining conference request had two idle Processing Elements could be used to provide a 10-node ring to support a 5-party conference implementation request.

FIG. 9 is an illustration that all 7 of the generic conference sets in the $2^\{R=4\}=16$ node canonical hyper-ring framework can be implementated using mutually disjoint rings for each conference in each set.

Figure 9A:
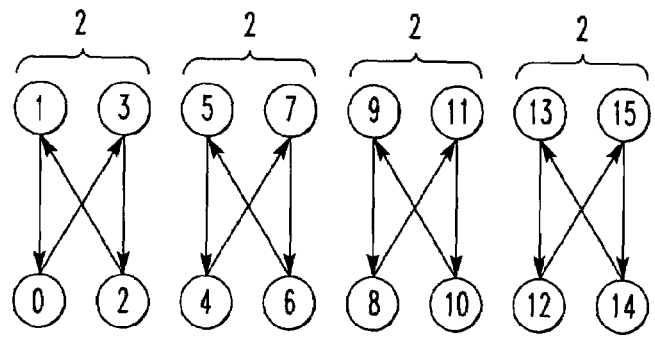
Figure 9B:
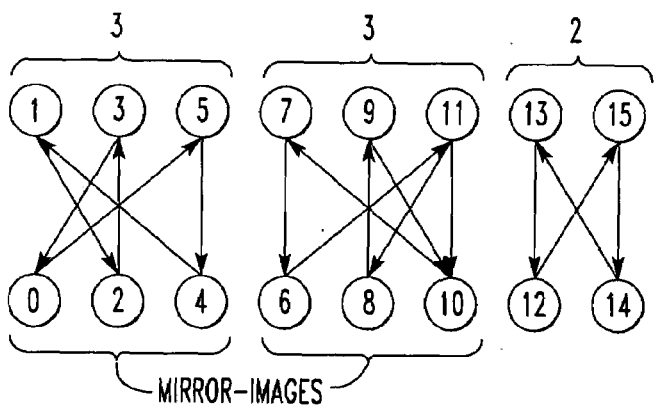
Figure 9C:
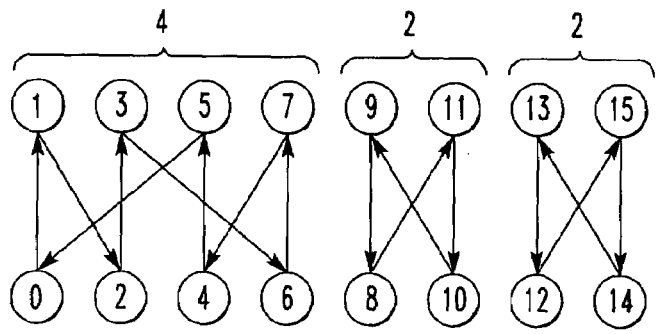
Figure 9D:
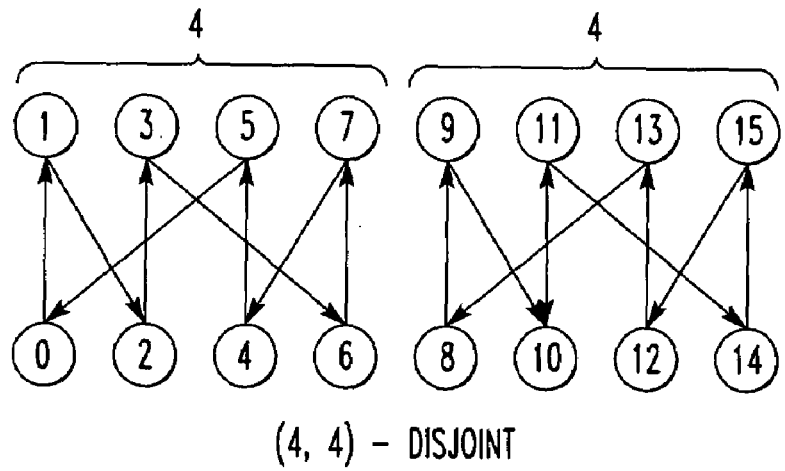
Figure 9E:
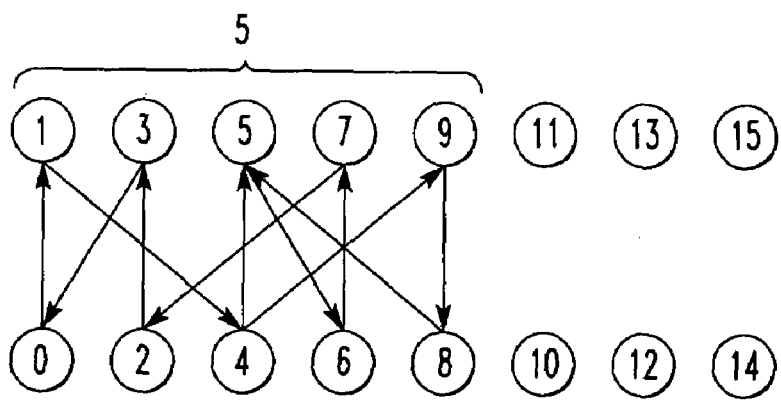
Figure 9F:
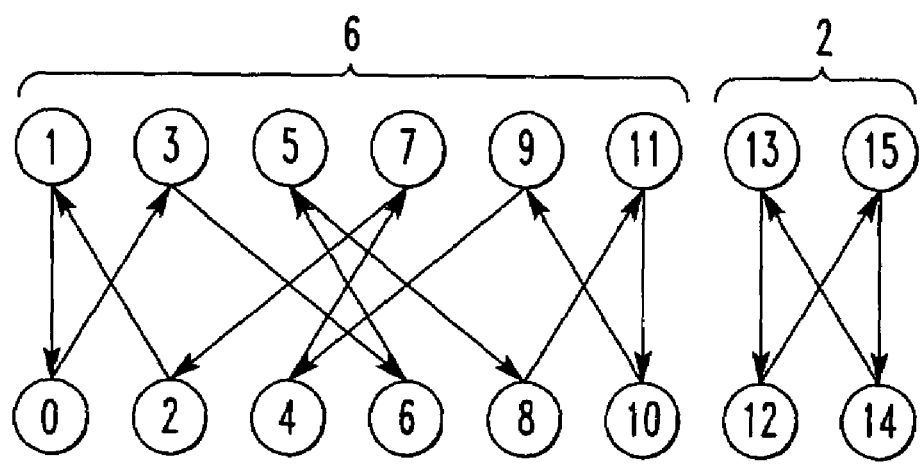

Furthermore, there are numerous variations of the 10-node rings that can be assigned to support the 10-party conference. In FIG. 9(e), the 10-node ring used over core rings $L\_\{0\}$, $L\_\{1\}$, $L\_\{2\}$ is 1->0->3->6->5->8->9->4->7->2->1. Obviously, a trivial variation of this 10-node ring would result if the direction of each link was reversed. However, another variation of this 10-node ring would be 1->4->9->8->5->6->7->2->3->0->1.

Accordingly, a conference resource assignment algorithm can be developed that deals with a new conference request by assessing the state of the hyper-ring in terms of the availability of idle Processing Elements and links on core rings, and attempting to match a core.

The essence of the robust connectivity among the Processing Elements in a $2^\{R\}$ node canonical hyper-ring framework is represented by the generalization of the concept of the "adjacency" of Processing Elements in different core rings as provided by the spanning links. In the special case of a 16 node hyper-ring, the adjacency of Processing Elements is a physical nearest-neighbor type of adjacency since the (parallel) spanning links as illustrated in FIG. 1 of core ring $L\_\{i\}$, i=1,2,3,4, each span to Processing Elements in core rings $L\ \{i-1\}$ and $L\_\{i+1\}$, where all index arithmetic is performed modulo 4. Hence, the adjacency of the Processing Elements of each of the core rings $L\_\{0\}$, $L\_\{1\}$, $L\_\{2\}$, $L\_\{3\}$ corresponds to the spanning link connectivity to the two core rings physically next to it.

For the more general $2^\{R\}$ node canonical hyper-ring framework where R>4, the adjacency goes beyond notion of physical nearest-neighbor core ring spanning links. As an example of this, FIG. 10 illustrates the twisted spanning links between the core rings $L\_\{0\}$, $L\_\{1\}$, ... $L\_\{6\}$, $L\_\{7\}$ in the $2^\{R=5\}=32$ node canonical hyper-ring framework. Each spanning link is denoted by a "0" and each core ring link is denoted by a "X" in a 16\times 16 matrix representing a bipartite graph between the even-numbered Processing Elements and the odd-numbered Processing Elements.

The adjacency of the Processing Elements in core rings as seen in FIG. 10 can be described as follows. All index arithmetic is performed modulo 8.

For the Even-Numbered Core Rings $L\_\{i\}$, i=0,2,4,6:

Each pair of twisted spanning links from the even-numbered nodes in $L\_\{i\}$ spans to the odd-numbered nodes in core rings $L\_\{i+1\}$, $L\_\{i+3\}$, $L\_\{i+7\}$.

Each pair of twisted spanning links from the odd-numbered nodes in $L\_\{i\}$ spans to the even-numbered nodes in core rings $L\_\{i+1\}$, $L\_\{i+3\}$, $L\_\{i+7\}$.

For the Odd-Numbered Core Rings $L\_\{i\}$, i=1,3,5,7:

Each pair of twisted spanning links from the even-numbered nodes in $L\_\{i\}$ spans to the odd-numbered nodes in core rings $L\_\{i-1\}$, $L\_\{i-3\}$, $L\_\{i-7\}$.

Each pair of twisted spanning links from the odd-numbered nodes in $L\_\{i\}$ spans to the even-numbered nodes in core rings $L\_\{i-1\}$, $L\_\{i-3\}$, $L\_\{i-7\}$.

It is clear from FIG. 10 that the core ring adjacencies among Processing Elements in the hyper-ring are not in general a physical nearest-neighbor type of adjacency, but rather can be more appropriately described as virtual adjacencies in order to convey their scope relative to providing an effective adjacency between core rings that are not physically adjacent within the hyper-ring. These virtual adjacencies represent the essence of the robust connectivity provided by the $2^\{R\}$ node canonical hyper-ring framework in that every core ring is adjacent to R−2 other core rings of which R−2 are not physically adjacent. In the following section, these virtual adjacencies will be specified in detail.

FIG. 10 illustrates the twisted spanning link connectivity among core rings $L\_\{0\}$, $L\_\{1\}$, \dots $L\_\{6\}$, $L\_\{7\}$ in the $2^\{R=5\}=32$ node canonical hyper-ring framework in terms of a 16\times 16 matrix representing a bipartite graph. Each spanning link is denoted by a "0" and each core ring link is denoted by a "X" in a bipartite graph between the even-numbered Processing Elements and the odd-numbered Processing Elements.

In FIG. 9 for the case of a $2^\{R=4\}=16$ node canonical hyper-ring framework, each generic conference set was implemented using only nearest-neighbor core ring adjacency due to the restricted types of physical nearest-neighbor adjacencies provided by the spanning links for the special of a 16 node hyper-ring canonical network framework. However, in general, to fully exploit the robust connectivity provided by the spanning links within the $2^\{R>4\}>16$ node canonical hyper-ring framework, a conference resource assignment algorithm must take advantage of the virtual adjacency among the Processing Elements.

A conference resource assignment algorithm requires a data structure to express the "state" of the hyper-ring at any time in order to implement a new conference request.

An extension of the $2^\{R-1\}\times 2^\{R-1\}$ matrix representation of the Processing Element adjacencies in the $2^\{R\}$ node canonical hyper-ring framework, as shown in FIG. 10 for the case of a $2^\{R=5\}=32$ node canonical hyper-ring framework, can be used by the control algorithm as a data structure to express the state of the virtual adjacencies among Processing Elements and the associated available links and their current bandwidth utilizations so as to support an assignment of resources to a conference implementation by a control algorithm.

The critical information regarding the state of the hyper-ring at any time is the following:

1. The configured direction (or lack thereof) of each link in the hyper-ring.

2. The number of conference content packets flowing through a link.

3. The assignment (or lack thereof) of each node in the hyper-ring to an implemented conference as either in Input Source Unit or an Output Destination Unit and/or a Pass-Through Unit.

This state information is self-explanatory in nature. However, it should be noted that for the case of (2) the number of content packets flowing through a link, for supporting an N-party conference, a primarily assigned link can be required to carry as many as N content packets, one from each Input Source Unit. If such a link were a candidate for an assignment as a Pass-Through link for another N'-party conference, the conference resource assignment algorithm would have to take into account the resulting delays and queuing implications of this additional assignment.

Furthermore, using the number of content packets be transmitted over a link as a state parameter implies that the bandwidth demanded by each content packet is the same. In general, this might not be the case. If so, then this state parameter would have to be generalized to the summation of the bandwidth demand for each content packet being transmitted over a link. However, this complication would not alter the nature the requirements of the conference resource assignment algorithm.

In general, the Link State Matrix of a $2^{\{R\}}$ node canonical hyper-ring framework is a two dimensional array comprised of $2^{\{R-1\}}$ even-numbered labeled rows and $2^{\{R-1\}}$ odd-numbered labeled columns. Each labeling of a row or column corresponds to a Processing Element node in the hyper-ring. The entry $e(i,j)=(D\_\{i,j\}, load\ \{i,j\}, conf\_assign\ (i,j))$ in the $i^{\{th\}}$ row and $j^{\{th\}}$ column of the state matrix corresponding to the link between nodes i and j is a three-tuple where:

D\_{i,j} denotes the configured direction of a link where:
D\_{i,j}=1 indicates a i->j direction has been configured;
D\_{i,j}=-1 indicates a j->i direction has been configured;
D\_{i,j}=phi indicates a no direction has been configured;
\item
D\_{i,j}=infinity indicates that a link between nodes i and j does not exist.

load\_{i,j} indicates the loading on the link between Processing Elements i and j in terms of the number of content packets currently being transmitted over the link in the configured direction where:
load\_{i,j}=0 indicates the link is not being used;
load\_{i,j}=x≧1 indicates the link is being used to support a conference and/or as a Pass-Through link to transmit as x content packets in the configured direction.

conf-assign(i,j)=(primary(i,j),pass-through(i,j)) indicates the conferences utilizing the link between Processing Elements i and j in terms of a primary support assignment or a pass-through assignment where:
primary(i,j)=W if the link has been primarily assigned to Conference W; otherwise primary(i,j)=phi
pass-through(i,j)={X, Y, . . . Z} if the link has been assigned as a Pass-Through link to Conferences X, Y . . . Z; otherwise pass-through(i,j)=phi As an example of a link state matrix for a conference implementation, for the 16 node hyper-ring canonical network framework of FIG. 6 implementing conferences X, Y, and Z, FIG. 11 shows the corresponding link state matrix. It should be noted that as described in FIG. 11, link 4 >5 which is used in the Conference X implementation also serves as a Pass-Through link for the Conference Y implementation, and hence, in the state matrix, e(4,5)=(D\_{4,5}=1,load\_{4,5}=3+2=5,conf-assign(4,5)=(X,\{Y\})).

FIG. 11 shows the state matrix for a $2^{\{R=4\}}=16$ node canonical hyper-ring framework, where a resource assignment has been made such that 3 conferences are concurrently implemented by means of three rings as illustrated in FIG. 6. The 3-tuple entries are only specified in the link state matrix for existing links that are not idle. A 3-party conference denoted as Conference X is implemented by means of RingX=(1->4->5->0->3->2->1); a 2-party conference denoted as Conference Y is implemented by means of RingY=(6->7->4->5->8->11->6); a 3-party conference denoted as Conference Z is implemented by means of RingZ=(9->10->15->14->13->12->9). Note that Processing Element 5 is a Input Source Unit for Conference X and Processing Element 4 is an Output Destination Unit for Conference X, and both Processing Elements are also utilized as Pass-Through Units for Conference Y, and furthermore that as described in the caption of FIG. 6, link 4->5 which is used in the Conference X implementation also serves as a Pass-Through link for the Conference Y implementation, and hence, in the link state matrix e(4,5)=(D\_{4,5}=1,load\_{4,5}=3+2=5,conf-assign(4,5)=(X,\{Y\})).

In FIG. 12, the state matrix for a $2^{\{R=4\}}=16$ node canonical hyper-ring framework as shown in FIG. 7 where mutually disjoint resource assignments have been made such that two 3-party conferences and one 2-party conference (which can collectively be referred to as a (3,3,2)-conference set) are concurrently implemented without using Pass-Through Units or Pass-Through links. Only the entries of utilized links are shown, and the entries are abbreviated to only indicate direction and conference supported.

FIG. 12 shows the link state matrix for a $2^{\{R=4\}}=16$ node canonical hyper-ring framework where mutually disjoint resource assignments have been made as shown in FIG. 7 such that two 3-party conferences and one 2-party conference are concurrently implemented without using Pass-Through Units or Pass-Through links. Only the entries of utilized links are shown, and the entries are abbreviated to only indicate direction and conference supported.

In general, the Node Assignment Vector of a $2^{\{R\}}$ node canonical hyper-ring framework is a one dimensional array comprised of $2^{\{R\}}$ entries, each entry node-assignment (i) for $0 \le i \le 2^{\{R\}}-1$ corresponding to each Processing Element in the hyper-ring where node-assignment(i)=(in(i), out(i), pass-through(i)) such that in(i)=Xj if Processing Element i has been assigned to conference participant Xj of Conference X as an Input Source Unit; otherwise in(i)=\phi.

out(i)=Xj if Processing Element i has been assigned to conference participant Xj of Conference X as an Output Destination Unit; otherwise out(i)=phi.

pass-through(i)={X, Y, . . . , Z} if Processing Element i has been assigned as a Pass-Through node to Conferences X, Y\dots Z; otherwise pass-through(i)=phi As an example of a node assignment vector for a conference implementation, for the 16 node hyper-ring canonical network framework of FIG. 6 implementing conferences X, Y, and Z, FIG. 6 shows the corresponding node assignment vector. It should be noted that as described in the caption of FIG. 6, that Processing Element 5 is a Input Source Unit for Conference X and Processing Element 4 is an Output Destination Unit for Conference X, and both Processing Elements are also utilized as Pass-Through Units for Conference Y, and hence, node-assignment(5)=(in(5)=X1,out(5)=phi,pass-through(5)={Y}) and
node-assignment(4)=(in(4)=phi,out(4)=X2,pass-through(5)={Y}).

FIG. 13 shows the node assignment vector for a $2^{\{R=4\}}=16$ node canonical hyper-ring framework, where a resource assignment has been made such that 3 conferences are concurrently implemented by means of three rings as illustrated in FIG. 6. A 3-party conference denoted as Conference X is implemented by means 1 of RingX=(1-->4-->5-->0-->3-->2-->1); a 2-party conference denoted as Conference Y is implemented by means of RingY=(6-->7-->4-->5-->8-->11-->6); a 3-party conference denoted as Conference Z is implemented by means of RingZ=(9-->10-->15-->14-->13-->12-->9). Note that Processing Element 5 is a Input Source Unit for Conference X and Processing Element 4 is an Output Destination Unit for Conference X, and both Processing Elements are also utilized as Pass-Through Units for Conference Y, and hence,
node-assignment(5)=(in(5)=X1,out(5)=phi,pass-through(5)={Y}) and
node-assignment(4)=(in(4)=phi,out(4)=X2,pass-through(5)={Y}).

Obviously, a conference resource assignment algorithm in response to a new conference request would ideally want to utilize conference resources that are disjoint from all currently assigned conference resources. The combination of the link state matrix and the node assignment vector completely defines the state of a $2^{R}$ node canonical hyper-ring framework at any time and under any loading. The availability of idle Processing Element nodes and links becomes apparent from scanning the entries of the link state matrix and the node assignment vector. Using the node assignment vector, delete each row or column from the link state matrix corresponding to a Processing Element that has been assigned as an Input Source Unit, or an Output Destination Unit, or a Pass-Through Unit. The resulting reduced link state matrix is comprised only of rows/columns corresponding to Processing Elements that are idle. To implement a p-party conference, a set of p even-numbered Processing Elements (row labels) and a set of p odd-numbered Processing Elements must be determined such that a 2p node ring can be established using the available idle links. Transform the reduced link state matrix into a new type of data structure called a link indicator matrix which indicates every idle link in hyper-ring relative to every idle Processing Element. This can be accomplished by simply replacing each entry for which the $D_{i,j}$ not equal to infinity in the reduced link state matrix with an link indicator symbol (for example, an "X") and leaving all other entries "blank".

Observation: A disjoint resource assignment of a 2p node ring of idle Processing Elements and links exists if and only if there is row/column permutation of the link indicator matrix such that a submatrix results with a {\bf generic ring structure} as shown in FIG. 14 for the case of N=4 as well as a general value of N.

Clearly, any row/column permutation of the generic ring structure also serves as an indicator of the availability of Processing Elements and links that can be used to provide a 2p node ring that can be assigned to a p-party conference request. The conference resource assignment algorithm would perform row/column permutations with the goal of matching a submatrix within the resulting link indicator matrix with a generic ring structure.

Input: a p-party conference request, and a link state matrix and a node assignment vector for the hyper-ring}

Output: A set of idle nodes and links that provide a disjoint 2p node ring for a p-party conference Step 1: Generate a reduced link state matrix by deleting all rows/columns of the link state matrix corresponding to assigned Processing Elements as determined by the entries in the node assignment vector.

Step 2: Generate a link indicator matrix as determined by the entries in the reduced link state matrix.

Step 3: Perform row/column permutations of the link state matrix to determine an intersecting set of p rows and p columns that matches a generic ring structure.

Step 4: Assign the conference participants to the 2p nodes according to the processing element assignment rule.

Figure 14A:
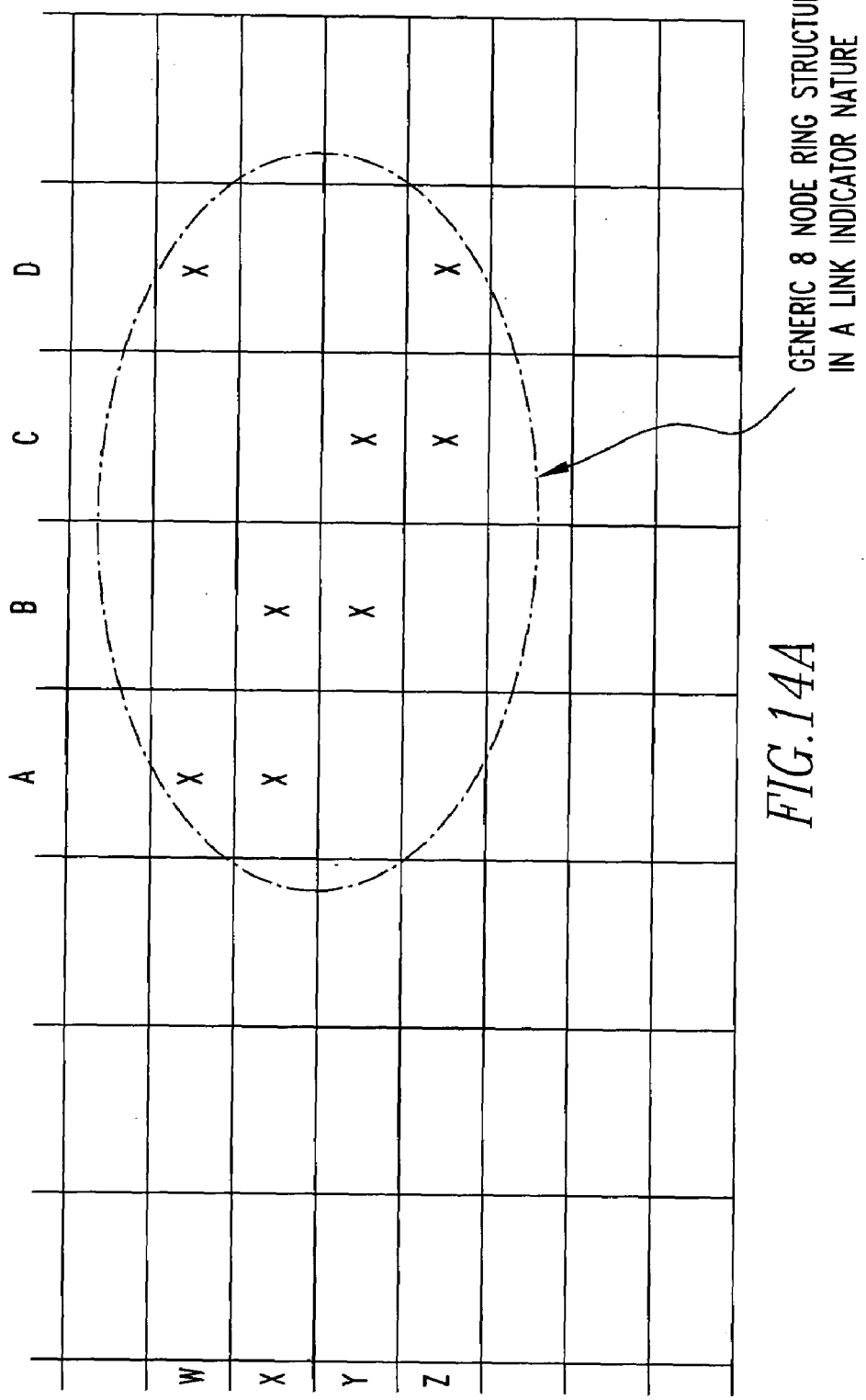
FIG. 14 shows a link indicator matrix.
Figure 14B:
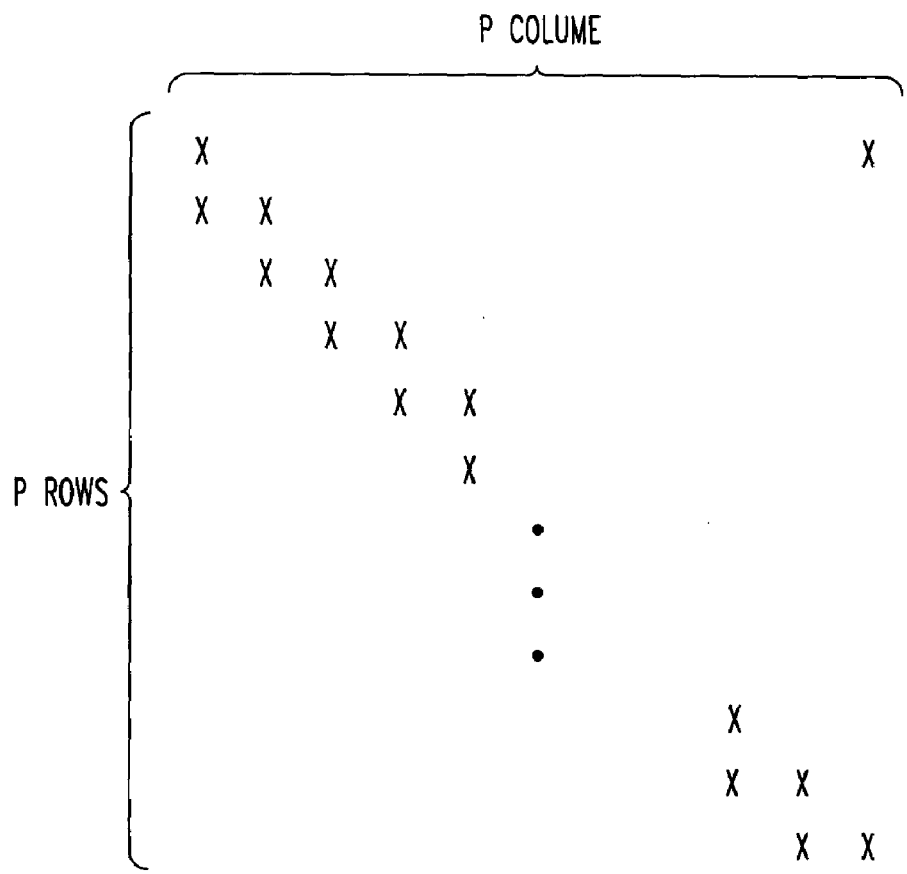

FIG. 14(a) shows a link indicator matrix that has undergone a row/column such that a so-called generic ring structure results for 4 rows (labeled W, X, Y, and Z) and 4 columns (labeled A, B, C, and D) which indicate that 8 node ring W->A->X->B->Y->C->Z->D->W can assigned to a 4-party conference request. FIG. 14(b) shows a generalization of a link indicator matrix that has undergone a row/column such that a so-called generic ring structure results for p rows and p columns which indicate that 2p node ring can assigned to a N-party conference request.

Given a $2^{R}$ node canonical hyper-ring framework and a specified ring of 2p Processing Elements (plus possible additional Pass-Through Units) assigned to support a p-party conference, there are numerous possibilities for routing the content packets associated with the conference among the assigned Processing Elements. The following discussion offers two approaches which could be taken to this routing process. The primary goal of the routing of content packets to/from conference participants is to take advantage of the robust adjacencies among the Processing Elements being provided by the sparse link connectivities in the hyper-ring structure. An important implication of the sparseness of the link connectivities in the hyper-ring is that so-called routing tables which specify the designated routes for content packet flow as determined by the conference resource assignment algorithm can be implemented with low overhead memory/buffer usage.

For the support of a p-party conference, each of the p Processing Elements operating as Input Source Units will be transmitting content packets from the corresponding assigned conference participant into the ring, and each of the p Processing Elements operating as a Output Destination Unit will be copying the payload of content packets into buffers for subsequent processing and delivery to the assigned conference participant.

In a $N=2^{R}$ node canonical hyper-ring framework augmented with both an I-ring and an O-ring, each Processing Element will have $\log_{2}(N)=R+2$ direction-programmable links for connections to other (neighboring) Processing Elements. Regarding the links associated with each Processing Element, in general, at any given time, there are three direction configuration possibilities:

Some of the links will be configured as output links supporting packet flow from the given Processing Element to other neighboring Processing Elements (that is, Processing Elements a distance of one link hop away) in the ring.

Some of the links will be configured as input links supporting packet flow to the given Processing Element from other neighboring Processing Elements in the ring.

Some of the links might be unconfigured.

In general, each link configured as an input link to a Processing Element will have a so-called input queue associated with it. The input queue of a input link stores all the arriving content packets for eventual processing according to an order representing some queuing discipline (for example, on a first-in/first-out basis, or possibly according to some priority criteria). Also associated with each input link will be a buffer into which a Processing Element operating as an Output Destination Unit can place a copy of a content packet from the input queue when this packet is identified to be relevant to the assigned conference participant of the primary supported conference. In this case, the copy of the content packet placed in the buffer would eventually be processed for delivery to the conference participant being supported.

When a content packet for the primary supported conference originates at a Processing Element as it operates as an Input Source Unit for its assigned conference participant, that Processing Element must be capable of routing it to the next sequential Processing Element(s) in the assigned ring that has been determined by the conference resource assignment algorithm.

If a content packet that originated at another Processing Element in the ring arrives on an input link of a Processing Element, the content packet is stored in the input queue of that Processing Element. Then if that Processing Element is operating as an Output Destination Unit for the primary supported conference to which this content packet is relevant, the the packet is copied into its buffer, and, in general, the Processing Element must additionally route it to the next sequential Processing Element(s) in the assigned ring via one of its output links. An exception to this is the case where a content packet arrives on an input link, and the Processing Element determines that it is the terminal Processing Element in this content packet's route. In this case, this Processing Element does not route the packet to another Processing Element.

If instead the Processing Element is operating as a Input Source Unit for the primary supported conference to which this content packet is relevant, the packet is not stored in the Processing Element's buffer, but the packet must still be routed to the next sequential Processing Elements in the assigned ring.

Any of the 2p Processing Elements supporting a p-party conference as either Input Source Units or Output Destination Units might also be serving as a Pass-Through Unit for other conferences being supported within the $2^{\{R\}}$ node canonical hyper-ring framework, or there can be Processing Elements supporting a p-party conference that only operate as Pass-Through Units. When content packets from such conferences arrive on input links of such a Processing Element in the ring, they are initially stored in the input link's queue, and then the Processing Element routes them to the appropriate output links, but does not store them in the input link buffer.

When a content packet in an input queue of a Processing Element is to be transmitted via a particular output link to other Processing Elements in the hyper-ring as determined by a routing table, the content packet is transferred from the input queue to the output queue of the appropriate output link for subsequent transmission to the next sequential Processing Elements in the assigned route. The Processing Element will transmit the packets in its output queue according to some ordering dependent on an agreed upon priority or fairness criteria according to the requirements of the application being supported.

The packet arrival rate into the input queue of an input link must always be less than the content packet departure rate. In the case of departures of content packet from an input queue, there are two possibilities: (a) transfer of content packets to output queues; and (b) removal of content packets from the input queue when the Processing Element determines it is the terminal Processing Element in the content packet's route. Clearly, if the arrival rate exceeds the departure rate, the queue will eventually overflow, and content packet loss will result. Similarly, it should also be clear that the content packet arrival rate into the output queue of an output link must always be less than the content packet departure rate from that queue. If the case of arrivals of content packets to an output queue, there are two possibilities: (a) transfers of content packets from input queues; (b) new content packets from the conference participant being served by the Processing Element when it is operating as a Input Source Unit. Again, if the arrival exceeds the departure rate, content packet loss results.

Figure 19:
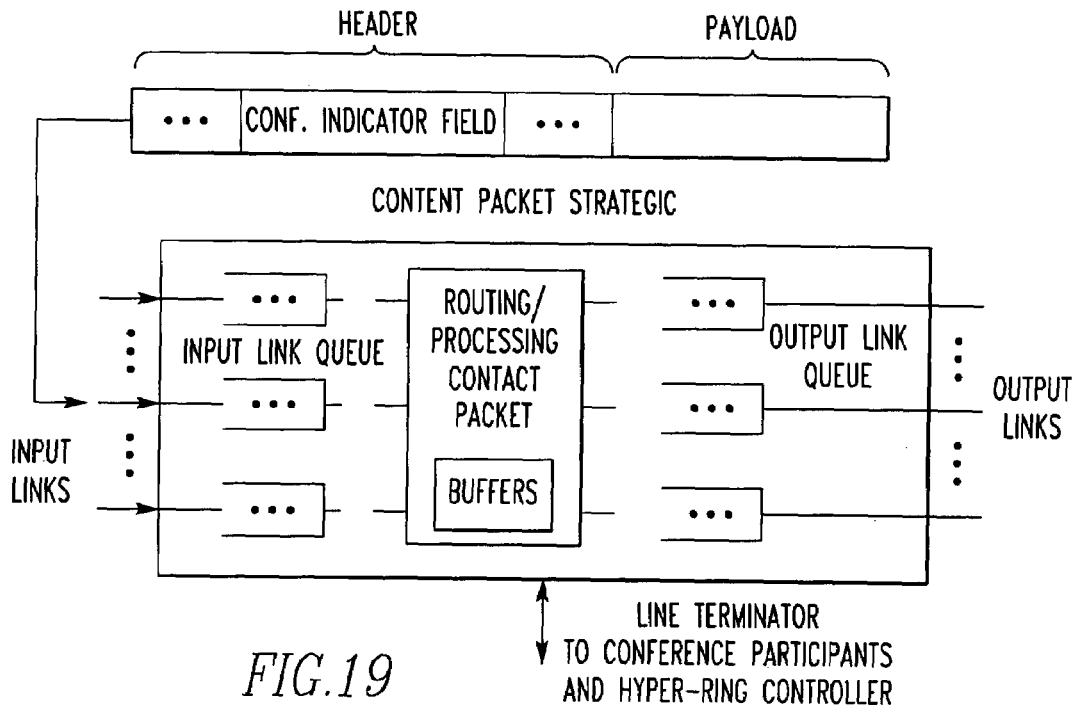
FIG. 19 is an illustration of the functional components of a Processing Element regarding links configured as inputs, outputs, or unconfigured, as well as associated queues, buffers, and the processing engine.

FIG. 19 depicts the functional components of a Processing Element regarding links configured as inputs, outputs, or unconfigured, as well as associated queues. The buffer memory would be used to store content packets that will eventually be processed for delivery to the assigned conference participant when the Processing Element is operating as an Output Destination Unit in support of a conference; the buffer memory would be used to store content packets that will be routed to other Processing Elements in the assigned ring when the Processing Element is operating as a Input Source Unit.

The routing of content packets from input links to output links can be accomplished by means of a routing table maintained by the Processing Element in conjunction with either a global conference controller or with a distributed controller strategy employed by the Processing Elements in the hyper-ring. To determine the routing of content packets arriving on input links to the appropriate output links according to a route determined by the conference resource assignment algorithm, a generic structure of a content packet must first be described.

In general, each content packet will have a header component and a payload component. The payload component will generally consist of the multimedia information being shared by the conference participants. The header component can be comprised of fields and flags relative to status, routing, and error detection/correction information. The details of these header and payload components are, of course, dependent on the application being supported by the hyper-ring.

Among these header fields, there can be a conference identifier field that can be used by the Processing Element as part of a key with which to reference the routing table to determine the appropriate output link(s) (if any) to which to forward a packet arriving on an input link according to a route determined by the conference resource assignment algorithm relative to some required quality of service criteria demanded by the conferencing applications. In general, a specification of conference identifier number to a given conference can be made by the conference controller of the hyper-ring. The controller would broadcase the conference identifier to all the Processing Elements assigned by the conference resource assignment algorithm to the primary support of the conference. The advantages of using a conference identifier are numerous, not the least being that specific conference implementations could then be given priorities by the supporting Processing Elements, and testing of the performance of a hyper-ring by means of special test conferences would be facilitated.

The entries in the routing table of a Processing Element could be provided by a global controller for the hyper-ring which has access to state information regarding existing conference implementations related to every Processing Element and link in the structure. Alternatively, the entries in the routing table could be provided by an iterative exchange of state information by Processing Elements with each of its neighbors, which effectively represents a distributed controller implementation. Both approaches are feasible with the $2^{\{R\}}$ node canonical hyper-ring framework. The details of the establishment and updating of the routing tables of the Processing Elements in a $2^{\{R\}}$ node canonical hyper-ring framework are dependent on specifics of the applications being supported as well as the desired quality of service performance measures demanded.

Figure 20:
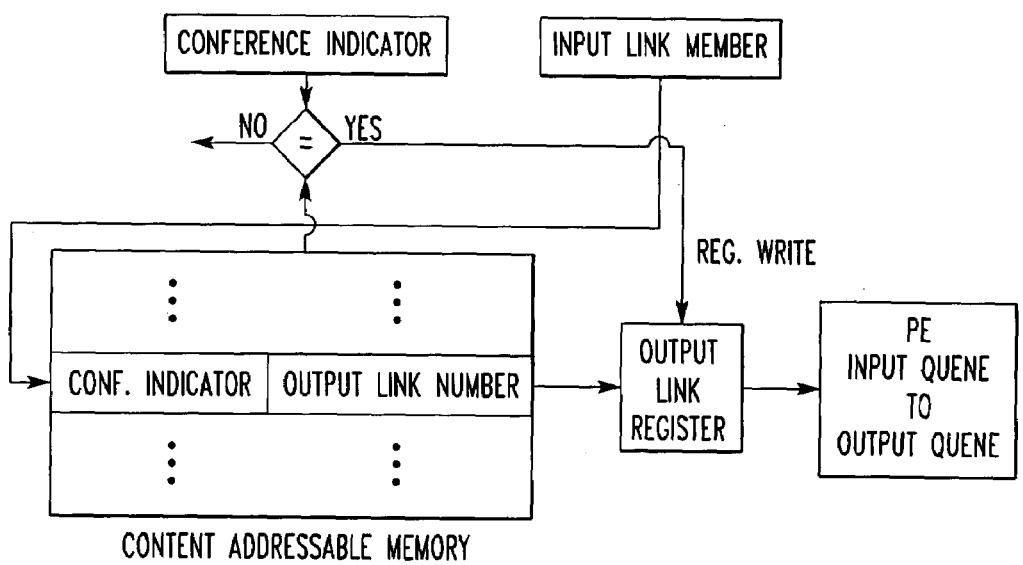
FIG. 20 shows an example of the conference indicator field of a content packet together with input link number arriving at a Processing Element being used to address a content addressable memory in order to determine the output link queue(s) to which the content packet should be forwarded.

Given that a content packet arrives on an input link of a Processing Element and is placed in the link's input queue, the conference identifier field can be extracted from the header. The combination of the input link number and the value in the conference identifier field can together serve to determine the entry in the routing table which indicates the output link(s) (if any) to which the content packet should be forwarded, as well as whether the payload of the content packet should be buffered for eventual delivery to the conference participant which this Processing Element might be serving as an Output Destination Unit. As an example, the combination of the input link number and conference identifier could be used to address a content addressable memory. The input link number could be used as and index. Then if a match is found in a location for given index regarding the conference identifier, a specification of the output link(s) would be available. This is illustrated in FIG. 20.

Using a routing table permits routes the supported conference implementations to be modified and/or optimized regarding resource utilization as conferences terminate or gain/lose participants.

Within the header field of a content packet, a set of $N=2^{\{R\}}$ bits, one bit corresponding to each Processing Element in the hyper-ring, can be used to indicate the Processing Elements to which the packet must be routed as determined by the conference resource assignment algorithm in support of conference. This resulting set of $N=2^{\{R\}}$ bits can be referred to as a destination mask for the content packet. Since the content packet must be routed to all of the Processing Elements serving as Output Destination Units or Pass-Through Units in the conference, for a p-party conference, a set of at least p−1 of the $N=2^{\{R\}}$ bits would be set to "1" to indicate which Processing Elements that were determined by the conference resource assignment algorithm to serve as Output Destination Units for the conference. All other bits would ideally be "0" bits. However, in general, more than p−1 bits might be set to 1 if some of the Processing Elements in the hyper-ring are serving as Pass-Through Units in support of the conference.

It is worth noting that if all conference implementations are disjoint regarding the Processing Elements and links utilized, then the total destination mask could also serve as a conference identifier.

For each of the links of a Processing Element configured as an output link, another set of $N=2^{\{R\}}$ bits can serve as a Processing Element reachability mask. The reachability mask of an output link of a given Processing Element will have a 1 bit in each position corresponding to the set of Processing Elements that are reachable according to some quality of service criteria (for example, minimum hop path or least congested path).

By performing simple Boolean operations, such as a logical AND operation, on a destination mask for an arriving content packet and the reachability mask of each output link, the output links to which the content packet should be routed can be determined. Additionally, when a content packet reaches a particular Processing Element indicated by its destination mask, the bit corresponding to that particular Processing Element can be changed from a 1 to 0 so that content packet does not return to that Processing Element.

Figure 21:
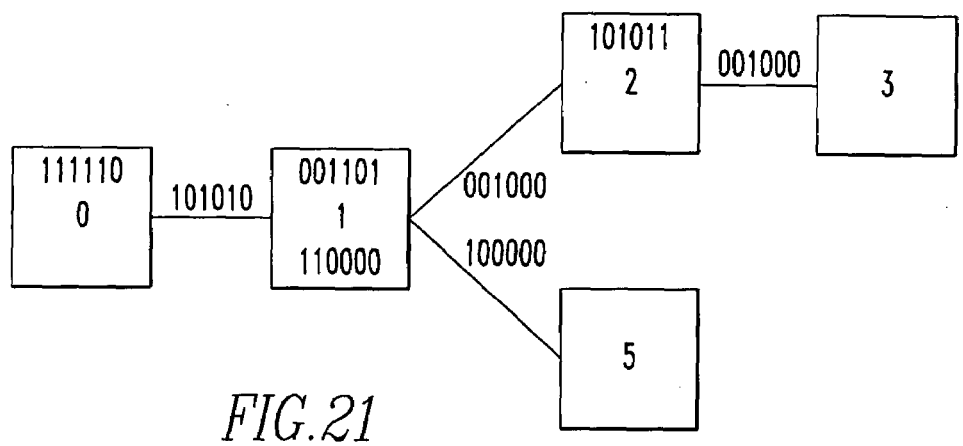
FIG. 21 shows an example of the use of routing masks to control content packet flow.

FIG. 21 shows the use of routing masks to control content packet flow. In the example, a route has been set up by the conference resource assignment algorithm to transmit content packets from Processing Element 0 to Processing Elements 1, 3, and 5. This means that for the conference being supported, regarding content packets that are being transmitted from Processing Element 0, Processing Element 0 is operating as a Input Source Unit, and regarding Processing Elements 1, 3, and 5 that are receiving these packets, the Processing Elements are operating as Output Destination Units. This content packet flow can be viewed as a multicast of a payload from Processing Element 0 to Processing Elements 1,3, and 5.

The destination mask of a content packet originating in Processing Element 0 is seen to be 101010, where the rightmost bit in the destination mask corresponds to Processing Element 0 and leftmost bit corresponds to Processing Element 5. In general, there would be $N=2^{\{R\}}$ bits in the destination mask, but the example only requires this subset and for simplicity only this subset is shown. The payload parts of the content packets are not shown in order to make the figure less complicated, but should be assumed to exist.

In FIG. 21, the output link being used by Processing Element 0 has a reachability mask of 111110 which indicates that Processing Elements 1 to 5 can be reached via this output link. Only the destination mask fields of the content packets flowing from Processing Element 0 to Processing Element 1 are shown in the figure. Note that Processing Element 1 takes the content packet flow and branches it into two routes, one branched route going through the output link with reachability mask 001101 that will reach Processing Element 2 and Processing Element 3, and other branched route going through the output link with reachability mask 110000. It should be understood that the payload parts of the content packet are transmitted in both branched directions as this payload was generated by the conference participant assigned to Processing Element and must be delivered to the Output Destination Units Processing Elements 1,3, and 5.

The destination mask of the content packets flowing from Processing Element 1 to Processing Element 2 is 001000, and the destination mask of the content packets flowing from Processing Element 1 to Processing Element 5 is 100000. It is seen that the destination mask of the content packets flowing from Processing Element 1 to Processing Elements 2 and 5 have the bit corresponding to Processing Element 1 set to 0 so that these content packets will not be re-routed back to Processing Element 1. Note that Processing Element 2 is not an Output Destination Unit for this content packet flow, but rather serves as a Pass-Through Unit. Finally, the destination mask of the content packets flowing from Processing Element 2 to Processing Element 3 is 001000. The output link used by Processing Element 2 has a reachability mask of 101011.

Hence, FIG. 21 illustrates the destination masks and reachability masks for a routing tree for multicasting content packets from Processing Element 0 operating as an Input Source Unit to Processing Elements 1,3, and 5 operating as Output Destination Units. Since each Processing Element is generally assumed to be capable of operating as on Input Source Unit or a Output Destination Unit, but not simultaneously as both, to complete the content packet flow for this conference implementation, there will need to be 4 other Processing Elements involved, 3 operating as Input Source Units and one operating as an Input Source Unit. A multicast tree could then be established among this 8 Processing Element by the appropriate configuration of links and assignment of Processing Elements.

The general $2^{\{R\}}$ node canonical hyper-ring framework can be pruned of Processing Elements and links in order to satisfy various size requirements for a given application. For example, given a 16 node hyper-ring canonical network framework, suppose an application required, say, only Processing Elements. To satisfy such an application, some 6 of the 16 Processing Elements could be deleted from the 16 node hyper-ring canonical network framework, together with all the associated links. The conference resource assignment algorithm could be modified so as to operate such that these deleted Processing Elements and links were not available for usage in implementing new conference requests.

As an alternative to pruning, given a $N=2^{\{R\}}$ node hyper-ring canonical network framework as a building block, a canonical network framework can be formed with k times $N=k$ times $2^{\{R\}}$ Processing Elements by binding k $2^{\{R\}}$ node canonical hyper-ring frameworks together by means of what can be referred to as binding links. Such a set of connected building block hyper-rings will be referred to as a composite hyper-ring.

The Binding Links in Composite Hyper-Ring Can be of Two Types:

Binding links can be additional supplemental spanning links which span from core rings in a $2^{\{R\}}$ node canonical hyper-ring framework to core rings in some subset of the other k−1 $2^{\{R\}}$ node canonical hyper-ring frameworks in the composite hyper-ring.

Binding links can be spanning links and/or I-ring or O-ring links from a $2^{\{R\}}$ node canonical hyper-ring framework that are re-directed to core rings in some subset of the other k−1 $2^{\{R\}}$ node canonical hyper-ring frameworks in the composite hyper-ring.

Figure 24:
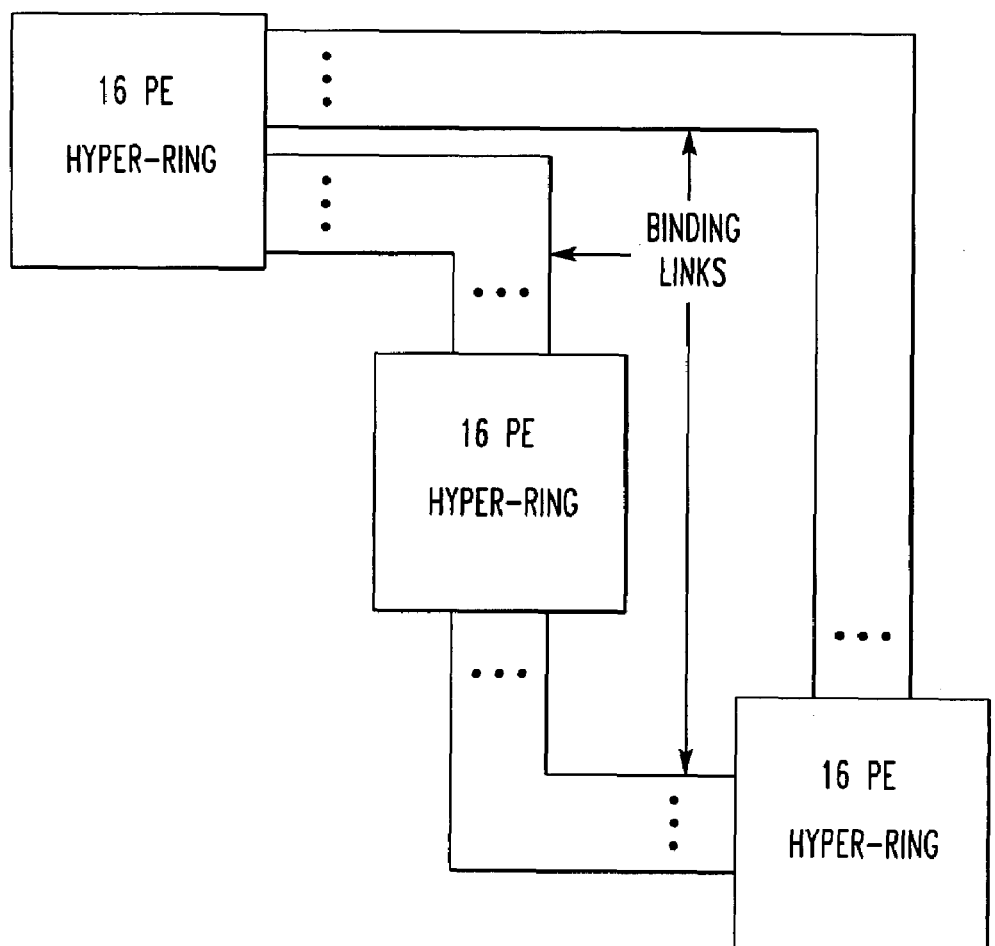
FIG. 24 shows an example of a binding of k=3 16 node hyper-ring canonical network framework to form a 48 node hyper-ring canonical network framework.

For example, suppose that an application required 48 Processing Elements. Using the pruning approach, a 64 node hyper-ring canonical network could be pruned by removing 16 Processing Elements and the associated links from the structure. Alternatively, using a 16 node hyper-ring canonical network framework as a building block, k=3 such hyper-rings could be interconnected by means of binding links. This is illustrated in FIG. 24.

A fundamental issue that must be addressed regarding the binding of a set of building block hyper-rings to form a composite hyper-ring structure relates to the use and specification of the binding links in terms of the number of link-hops required to establish a route from any one of the building block $2^{\{R\}}$ node canonical hyper-ring frameworks to any of the other $2^{\{R\}}$ node canonical hyper-ring frameworks. To assure that a minimal number of binding links are employed that provide a maximum reachability, a set of binding rules can be determined.

For example, using the 16 node hyper-ring canonical network framework as the building block, the following binding rule should be utilized:

Optimal 2 hop reachability binding rule with $m \geq 2$ building blocks}:

Each 16 node hyper-ring building block connects to 4 other 16 node hyper-ring canonical network frameworks in the composite hyper-ring.

(1): Number the hyper-rings 0,1, . . . , m−1.

(2): Find the smallest b such that $2^{\{b\}}+1 \geq m$ (3): For hyper-ring number s, place binding links to the hyper-rings with numbers s+1, s−1, s+b, and s−b, where all arithmetic is performed modulo m.

For example, if m=10, then $2^{\{4\}}+1 \geq 10$, so each 16 node hyper-ring will have binding links to the hyper-rings +1, −1, +4, and −4 (mod 10) away. If m=9, then $2^{\{3\}}+1 \geq 9$, so each 16 node hyper-ring will have binding links to the hyper-rings +1, −1, +3, and −3 (mod 9) away.

Depending the number of Processing Elements in the building block and the number of building block that must be linked by binding links, variations of this rule can be specified.

Figure 22:
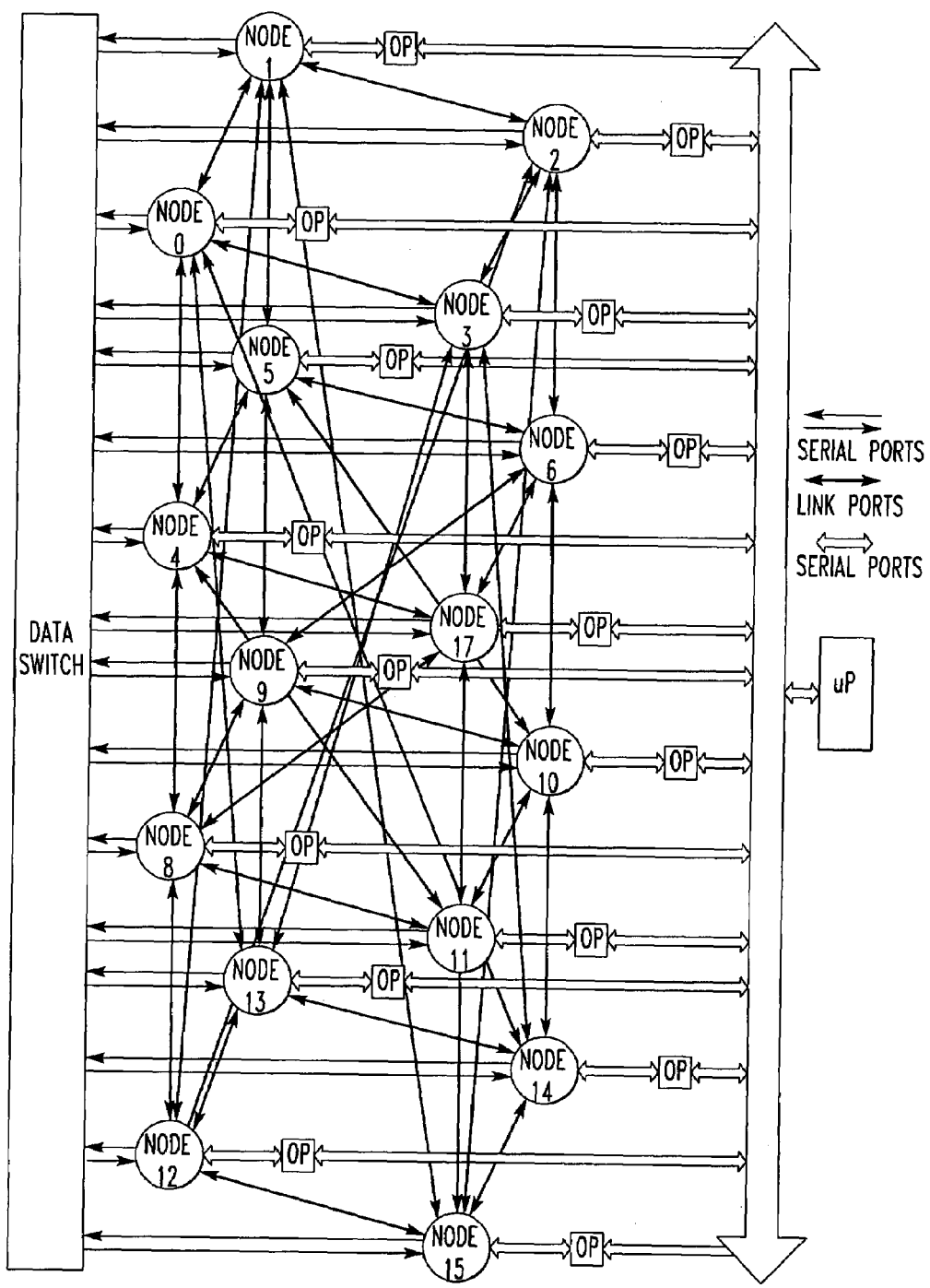
FIG. 22 shows a hyper-ring configuration at the module level.

The hyper-ring configuration was implemented at the module level as illustrated in FIG. 22. At the module level, 16 nodes (DSPs) were connected. For an eight port system, this would allow one DSP to be used for input processing (decoding of video signals) and one DSP for output processing (encoding of video signals) for each port in the system. For a 16 port system, this would require each DSP to perform both encoding and decoding functions for each port at full load.

On the module, each node has five link port connections to other nodes on the same module. The sixth link port from each node (not illustrated) is brought off the board to connect to other modules in the system. As illustrated in FIG. 22, each node is a member of a ring that consists of four members in a planar structure. We will call these base rings. These four base rings are then connected together in a three dimensional lattice such that each node now becomes part of a set of four member rings in each of the x, y, and z planes. To minimize the number of nodes that information would have to pass through to get from one node to another node in the lattice, additional connections are made, as illustrated, between the planar rings. These connections connect the "top" of the structure with the "bottom" of the structure as well as provide some internal connections. Additionally, these connections are twisted and thus yield a multidimensional structure.

Each node in the array is also connected to a host microprocessor that is responsible for configuring and coordinating the functions performed by the DSPs in the array. The interface between each DSP and the microprocessor consists of a dual port memory device. The dual port memory is connected to the parallel bus interfaces on both the DSP and the microprocessor. A mail box structure is set up in this dual port memory which allows each side to place messages in separate regions of the memory and then set a flag (or interrupt) to the other side to let it know that a message is ready for pick up. It is the responsibility of the microprocessor to configure the nodes in the array to inform these nodes about the type of processing they are to perform. The microprocessor also defines which other members of the array will be sharing information with that node and which direction it should expect to receive or transmit information from or to the other nodes in the array.

Information is presented to each of the nodes from a data switch on the module. This is a time division switch that receives its information from other modules in the system (not illustrated) It then takes this information and routes it to the nodes in the processing array via a set of serial ports. Processed information from this array is then returned to the data switch via serial ports as well. The data switch then distributes the processed information to other modules in the system. The microprocessor is also responsible for mapping the connections in the data switch. This is a parallel interface (not illustrated).

Figure 23:
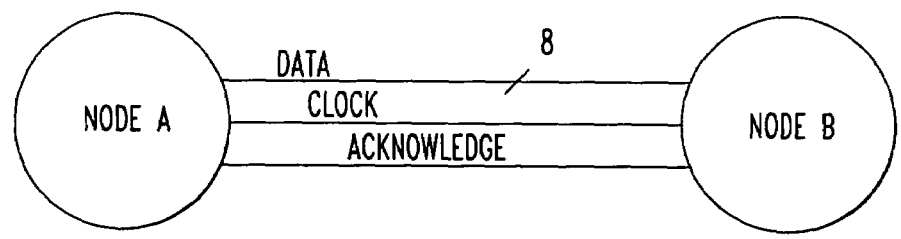
FIG. 23 illustrates a typical link between two processing nodes using these link ports.

Processing nodes and the links between them within a hyper-ring structure were realized by utilizing Analog Devices, Inc.'s ADSP-21160 SHARC DSP. SHARC is an acronym for Super Harvard Architecture and is a registered trademark of Analog Devices, Inc. The ADSP-21160 is a high performance, floating-point DSP with a unique set of link ports that make it readily adaptable to the hyper-ring architecture. Each SHARC contains a set of six independent link ports capable of moving data between devices simultaneously. FIG. 23 illustrates a typical link between two processing nodes using these link ports.

Each of these link ports contains eight data bits, one clock bit, and one acknowledge line. The directionality of these lines is under software control and can readily be changed back and forth. When configured as a transmitter, the transmitting device drives data out on all eight data bit lines as well as driving the clock line. The clock speed with which data is transmitted can be either at the external device clock speed (the clock speed provided to the DSP by an external clock source) or it can be at the internal DSP clock speed, which runs at twice the external clock frequency. The receiver drives the acknowledge line. Data transfers are asynchronous. Data transfers consist of 4 bytes of information if running in 32-bit word mode, or 6 bytes if running in 48-bit word mode. Each byte is transferred on the rising edge of the clock and latched by the receiver on the falling edge of the clock. After the receiver has received a word's worth of information, it asserts the acknowledge line indicating that it is ready to receive transfer of the next word of information. The transmitter waits to see the acknowledge line asserted before beginning the next link port transfer.

Because of the coupled nature of the data lines with the clock line, the implementation of these link ports ensured that a tight skew be maintained between these lines. At the printed circuit board level, this meant matching trace lengths to within a fraction of an inch for each set of data and control lines for the link. Also, controlled impedance traces and series termination techniques were used to maximize energy transfer and minimize distortion of these signals. When driving link ports between modules at the system level, device drivers were employed to handle the extra transmission load. Devices were selected with minimum delay differences between drivers so that the tight skew tolerance would be maintained. Furthermore, controlled impedance connectors were employed between the individual modules and the backplane so that controlled impedance path would have a minimum set of discontinuities.

Each link port within the DSP has its own set of buffers for transmitting and receiving information. These are controlled by independent DMA (Direct Memory Access) channels which allow it to move data between link ports, to the processor core for processing, or to external memory. Link ports with the DSP also contain interrupts which can be used as service requests as well as an error register for detecting errors in the transmission of data on the link ports.

For a system with a single conferencing board, the control would be as previously described with the local host making all the decisions as to port to node connections and directing link paths.

For a multi-board set-up, it is preferable for a single master controller to make the port to node decisions, so that global loading and fragmentation can be considered. In this case the master controller, PMM, makes the port to node decisions and instructs each local host what to connect. The link usage could be done the same way, or to reduce the computational load on the PMM, each local host could evaluate the optimal linkage given the local nodes involved and the off-board link connections desired. This method could result in a sub-optimal set of decisions due to the limited knowledge at each host. Wherever the decisions are made, they will follow the algorithm described before.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A network over which a medium is transferred comprising: S core rings, each said core ring of which can be modeled as a set of nodes interconnected by links, where S is greater than or equal to 4 and is an integer, each said core ring having at least N nodes, where N is greater than or equal to 4 and is an integer, each node and link configurable in terms of directing the medium from a given source toward a given destination, and where each of the core rings is intersected by means of k spanning rings, where k is greater than or equal to 2, and such that there are two different routing paths comprised of links and nodes from each node on any core ring to any other node on any other core ring, and each node has only one of the two different routing paths available to it, wherein a first ring is connected to a second ring by at least one spanning ring in which the directionality of a medium flow is configurable, the nodes of each ring are connected by core links in which the directionality of the medium flow is configurable, the nodes of each ring are configurable so as to serve simultaneously as both input sources of the transferred medium and output destinations of the transferred medium, the links are bi-directional regarding the medium flow.

2. A network as described in claim 1 wherein the medium includes data and wherein each node includes a processor for processing the data.

3. A network as described in claim 1 wherein the medium includes electricity and wherein each node includes a transmitter and a receiver for flow of the electricity.

4. A network as described in claim 1 wherein the medium includes photons (light energy/waves) and wherein each node includes a transmitter and a receiver for flow of the said photons.

5. A network as described in claim 1 wherein specified subset of nodes and links represent planar or multi-dimensional surfaces that facilitate the movement of objects in a multi-dimensional space from one location to another relative to both the sides of surfaces and relationships to nodes and links.

6. A network as described in claim 1 wherein each core ring has associated spanning links that span to all other core rings, or some subset thereof, that according to any specified ordering of the core rings are some power of any integer k greater than or equal to 2 distant from said core ring.

7. A network as described in claim 6 wherein each core ring has associated spanning links that span to some subset of all other core rings such that any node of a core ring can be linked to any other node of another core by means of a pre-determined number of hops to intermediate core rings and for which an algorithm to determine an appropriate combination of such hops can be based on a function of k that expresses the distance between the two core rings.

8. A network as described in claim 1 wherein each core ring has associated spanning links that span to some subset of all other core rings such that any node of a core ring can be linked to any other node of another core by means of a pre-determined number of hops to intermediate core rings.

9. A network as described in claim 1 wherein nodes can be assigned to sub-rings of any prescribed sizes such that the sum of the sizes is less than or equal to the totality of nodes in the network and such that each sub-ring is disjoint regarding nodes and links from all other sub-rings.

10. A network as described in claim 1 wherein nodes can be assigned to sub-rings of any prescribed sizes and regardless of any existing assignments of nodes and links to disjoint sub-rings a new additional sub-ring assignment can be made that is also disjoint from all existing sub-rings without modifying the existing assignments.

11. A network as described in claim 1 wherein nodes can be assigned to sub-rings of any prescribed sizes and regardless of any existing assignments of nodes and links to disjoint sub-rings a new additional sub-ring assignment can be made that is also disjoint from all existing sub-rings with only a specified upper-bounded modification of the existing assignments.

12. A network as described in claim 1 wherein nodes can be assigned to sub-rings of any prescribed sizes according to a specified criterion regarding the impact on existing assignments nodes and links relative to new additional assignments in the presence of some specified number of faulty nodes/links.

13. A recursive construction of the network as described in claim 1 wherein each node in a core ring unto itself represents an embedded network as described in claim 1.

14. A concatenated network comprised of the networks as described in claim 1 wherein the nodes of the core rings of the comprising networks also have spanning links to the nodes of other networks as described in claim 1 according to specified binding patterns regarding network to network coverage and reachability.

15. A network as described in claim 1 wherein each core ring has associated spanning links that span to some subset of all other core rings such that any node of a core ring can be linked to any other node of another core by means of a pre-determined number of hops to intermediate core rings and where each hop corresponds to a core ring to core ring distance that is a power of two.

16. A network as described in claim 15 wherein each core ring has associated spanning links that span to some subset of all other core rings such that any node of a core ring can be linked to any other node of another core by means of a pre-determined number of hops to intermediate core rings and for which an algorithm to determine an appropriate combination of such hops can be based on a binary representation of the distance between the two core rings.

17. A network as described in claim 1 wherein the directionality of the medium flow over each of the links between nodes is pre-configured in terms of orientation.

18. A network as described in claim 1 wherein the directionality of the medium flow over each of the links between nodes is pre-configured in terms of orientation and the nodes are partitioned into fixed categories according to whether they operate as conduits serving external devices as network input sources of medium and as network output destinations of medium.

19. A network as described in claim 1 wherein the directionality of the medium flow over each of the links between nodes is pre-configured in terms of orientation and the nodes are partitioned into fixed categories according to whether they operate as conduits serving external devices as network input sources of medium and as network output destinations of medium and there is an orientation bias regarding input source to output destination medium flow.

20. A network as described in claim 1 wherein the each node is associated with at least one other node which can serve as a back-up node regarding network reconfiguration so as to tolerate link and node failures.

* * * * *